(12) United States Patent
Omoto

(10) Patent No.: US 7,881,599 B2
(45) Date of Patent: Feb. 1, 2011

(54) MEASUREMENT DEVICE AND METHOD, IMAGING DEVICE, AND PROGRAM

(75) Inventor: Yasumichi Omoto, Kasugai (JP)

(73) Assignee: OMRON Corporation, Kyoto-shi, Kyoto (JP)

( * ) Notice: Subject to any disclaimer, the term of this patent is extended or adjusted under 35 U.S.C. 154(b) by 58 days.

(21) Appl. No.: 12/398,858

(22) Filed: Mar. 5, 2009

(65) Prior Publication Data

US 2009/0226158 A1 Sep. 10, 2009

(30) Foreign Application Priority Data

Mar. 7, 2008 (JP) .............................. 2008-057672

(51) Int. Cl.
G03B 3/00 (2006.01)
(52) U.S. Cl. ......................................... 396/89; 382/117
(58) Field of Classification Search .................... 396/51, 396/89, 106, 157; 356/3, 3.01, 3.03, 4.01, 356/4.05, 4.07, 5.01, 8; 382/106, 117, 190, 382/209; 348/333.12
See application file for complete search history.

(56) References Cited

U.S. PATENT DOCUMENTS 4,855,771 A 8/1989 Alligood et al.
5,418,596 A * 5/1995 Goto ........................... 396/106
5,565,942 A 10/1996 Hagimoto et al.
5,708,866 A 1/1998 Leonard
6,714,665 B1 * 3/2004 Hanna et al. ................ 382/117
2004/0207743 A1 * 10/2004 Nozaki et al. .......... 348/333.12
2005/0185243 A1 8/2005 Wenstrand
2007/0206938 A1 9/2007 Tanaka

FOREIGN PATENT DOCUMENTS

JP 3126061 B2 11/2000
JP 2007-037040 A 2/2007
KR 2003-0077128 A 10/2003

OTHER PUBLICATIONS

Extended European Search Report for European Application No. 09151781.3-1234 dated Jul. 8, 2009, 8 pages.
Patent Abstracts of Japan, Japanese Publication No. 2007-037040, Publication Date: Feb. 8, 2007, 1 page.

* cited by examiner

*Primary Examiner*—Clayton E LaBalle
*Assistant Examiner*—Autumn Parker
(74) *Attorney, Agent, or Firm*—Osha Liang LLP

(57) ABSTRACT

A measurement device has a light source, an imaging device, and a distance measuring section The distance measuring section obtains a distance between the imaging device and a person based on a presence of occurrence of a red-eye effect at an eye of the person in an image in which the person irradiated with an illumination light emitted from the light source is imaged by the imaging device, and a distance between an optical axis of the imaging device and the light source.

7 Claims, 30 Drawing Sheets

Fig. 2
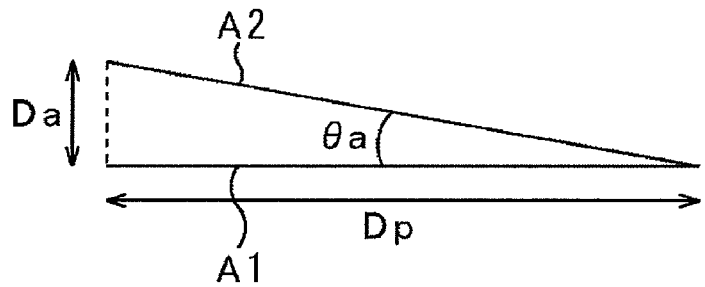
Fig. 3
| Inter-optical axis distance [mm] | Subject distance [mm] | | | | | | | |
|---|---|---|---|---|---|---|---|---|
| | 200 | 400 | 600 | 800 | 1000 | 1200 | 1400 | 1600 |
| 10 | ○ | ○ | ○ | ○ | ○ | ○ | ○ | ○ |
| 20 | | ○ | ○ | ○ | ○ | ○ | ○ | ○ |
| 30 | | | ○ | ○ | ○ | ○ | ○ | ○ |
| 40 | | | | ○ | ○ | ○ | ○ | ○ |
| 50 | | | | | ○ | ○ | ○ | ○ |
| 60 | | | | | | ○ | ○ | ○ |
| 70 | | | | | | | ○ | ○ |
| 80 | | | | | | | | ○ |
Fig. 4
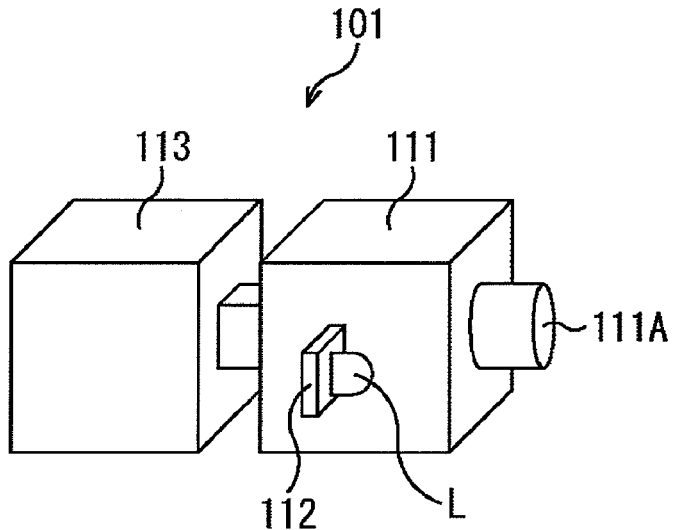

Fig. 20

| Face direction angle | Outside light state | |
| --- | --- | --- |
| | Dark | Bright |
| Smaller than threshold value | Confirm | Not confirm |
| Greater than or equal to threshold value | Not confirm | Not confirm |

(1) Horizontal arrangement (2) Vertical arrangement (3) Rectangular arrangement

Fig. 32
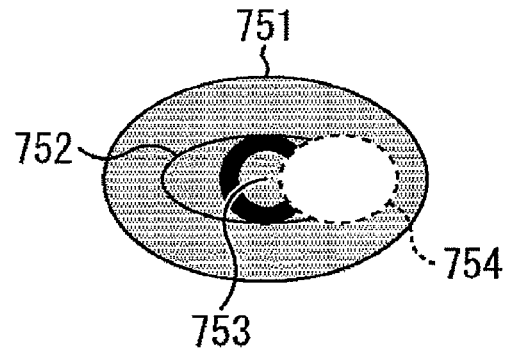
(1) Without polarization filter
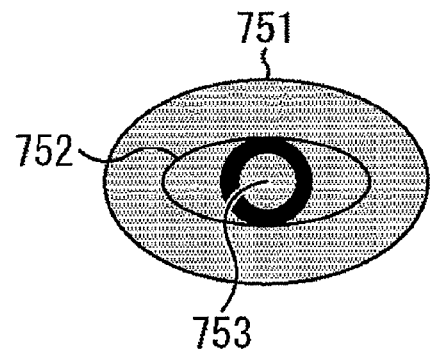
(2) With polarization filter
Fig. 33
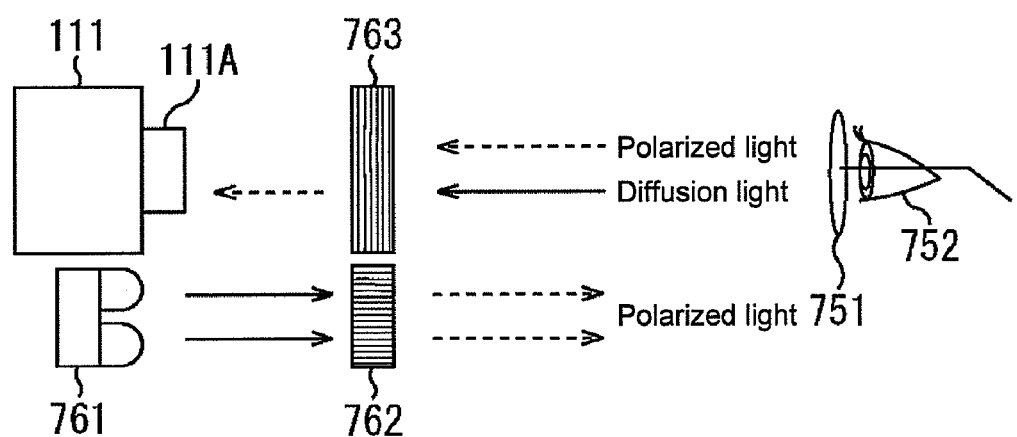

MEASUREMENT DEVICE AND METHOD, IMAGING DEVICE, AND PROGRAM

BACKGROUND OF THE INVENTION

1. Technical Field

The present invention relates to measurement devices and methods, imaging devices, and programs, and in particular to a measurement device and method for measuring the distance between an imaging device and a human, an imaging device, and a program.

2. Related Art

Conventionally, a method of measuring the distance (hereinafter referred to as a subject distance) between a camera and a human typically includes a method (active distance measurement) of irradiating a light ray towards a human and measuring the distance from the time until the reflected light is returned, a method (passive distance measurement) of calculating the distance based on contrast and the like in a photographed image, a method of radiating an electric wave towards a human and measuring the distance from the time until receiving the reflected wave, a method of performing facial recognition of a human in the photographed image and calculating the distance based on a feature quantity of a face such as the distance between left and right pupils, and the like (refer to, for example, Japanese Patent No. 3126061). In particular, the active distance measurement and the passive distance measurement are currently being greatly used in commercially available cameras.

SUMMARY

However, the active distance measurement, the passive distance measurement, and the method of measuring the subject distance using an electric wave are not targeted only on humans, and thus the distance may be mistakenly measured if an obstacle other than human cut in between. A dedicated unit needs to be arranged in camera when using the reflected wave of the electric wave.

Furthermore, in the method of measuring the subject distance based on the feature quantity of the face, calibration associating the feature quantity of the face and the subject distance is required for every person. Furthermore, when applying a constant association rule irrespective of the difference in person without performing calibration, the detection accuracy may lower due to individual difference in the feature quantity of the face.

One or more embodiments of the present invention enables the distance between the imaging device and the human to be reliably measured with a simple configuration.

In accordance with one aspect of the present invention, a measurement device includes a distance measuring section for obtaining a distance between an imaging device and a person based on presence of occurrence of red-eye effect at an eye of the person in an image in which the person irradiated with an illumination light emitted from a light source is imaged by the imaging device, and a distance between an optical axis of the imaging device and the light source.

In the measurement device of one aspect of the present invention, the distance between the imaging device and the person is obtained based on the presence of occurrence of the red-eye effect at the eye of the person in the image in which the person irradiated with illumination light emitted from the light source is imaged by the imaging device, and the distance between the optical axis of the imaging device and the light source.

Therefore, the distance between the imaging device and the person can be reliably measured with a simple configuration.

The distance measuring section is configured by a CPU, or the like.

The measurement device is further arranged with an illumination controlling section for controlling lighting and non-lighting of a plurality of the light sources; wherein the distance measuring section may obtain the distance between the imaging device and the person based on the presence of occurrence of the red-eye effect at the eye of the person when each of the light source is lighted, and a distance between the optical axis of the imaging device and the lighted light source.

With this arrangement, the distance between the imaging device and the person can be measured in more detail.

The illumination controlling section is configured by a CPU, or the like.

The illumination controlling section may obtain a range of a distance between the imaging device and the person based on a distance between the light source farthest from the optical axis of the imaging device of the light sources at which the red-eye effect occurred and the optical axis of the imaging device, and a distance between the light source closest to the optical axis of the imaging device of the light sources at which the red-eye effect did not occur and the optical axis of the imaging device.

With this arrangement, the range of the distance between the imaging device and the person can be more finely specified in detail.

The illumination light is an infrared light.

Thus, the red-eye effect continuously occurs even if the illumination light is continuously radiated, whereby the distance between the imaging device and the person can be more reliably measured.

In accordance with one aspect of the present invention, a measurement method and a program executed by a computer include a distance measuring step of obtaining the distance between the imaging device and the person based on presence of occurrence of red-eye effect at an eye of the person in an image in which the person irradiated with an illumination light emitted from a light source is imaged by the imaging device, and a distance between an optical axis of the imaging device and the light source.

In the measurement method and the program executed by the computer of one aspect of the present invention, the distance between the imaging device and the person is obtained based on the presence of occurrence of the red-eye effect at the eye of the person in the image in which the person irradiated with illumination light emitted from the light source is imaged by the imaging device, and the distance between the optical axis of the imaging device and the light source.

Therefore, the distance between the imaging device and the person can be reliably measured with a simple configuration.

The distance measuring step includes a distance measuring step, executed by the CPU or the like, of obtaining the distance between the imaging device and the person based on the presence of occurrence of the red-eye effect at the eye of the person in the image in which the person irradiated with illumination light emitted from the light source is imaged by the imaging device, and the distance between the optical axis of the imaging device and the light source.

In accordance with one aspect of the present invention, an imaging device includes a distance measuring section for obtaining a distance between the imaging device and a person based on presence of occurrence of red-eye effect at an eye of the person in an image in which the person irradiated with an illumination light emitted from a light source is imaged by the imaging device, and a distance between an optical axis of the imaging device and the light source.

In the imaging device of one aspect of the present invention, the distance between the imaging device and the person is obtained based on the presence of occurrence of the red-eye effect at the eye of the person in the image in which the person irradiated with illumination light emitted from the light source is imaged by the imaging device, and the distance between the optical axis of the imaging device and the light source.

Therefore, the distance between the imaging device and the person can be reliably measured with a simple configuration.

The distance measuring section is configured by a CPU, or the like.

According to one or more aspects of the present invention, the distance between the imaging device and the person can be reliably measured with a simple configuration.

BRIEF DESCRIPTION OF THE DRAWINGS

FIG. 2 shows a view for describing a principle applied to one or more embodiments of the present invention;
FIG. 3 shows a table showing a relationship between an inter-optical axis distance and a subject distance, and the presence of occurrence of the red-eye effect;
FIG. 4 shows a schematic view showing a configuration example of an outer appearance of an imaging device according to an embodiment of the present invention.

FIG. 20 shows a view showing an example of a reference for determining whether or not to confirm the subject distance;
FIG. 32 shows a view for describing mistaken detection of the red-eye effect by an eyeglass;
FIG. 33 shows an example of installation of a polarization filter.

DETAILED DESCRIPTION

Embodiments of the present invention will be described below with reference to the drawings.

First, the principle applied to the measurement of the subject distance between the imaging device and the human in one or more embodiments of the present invention will be described with reference to FIGS. 1 to 3.

Figure 1:
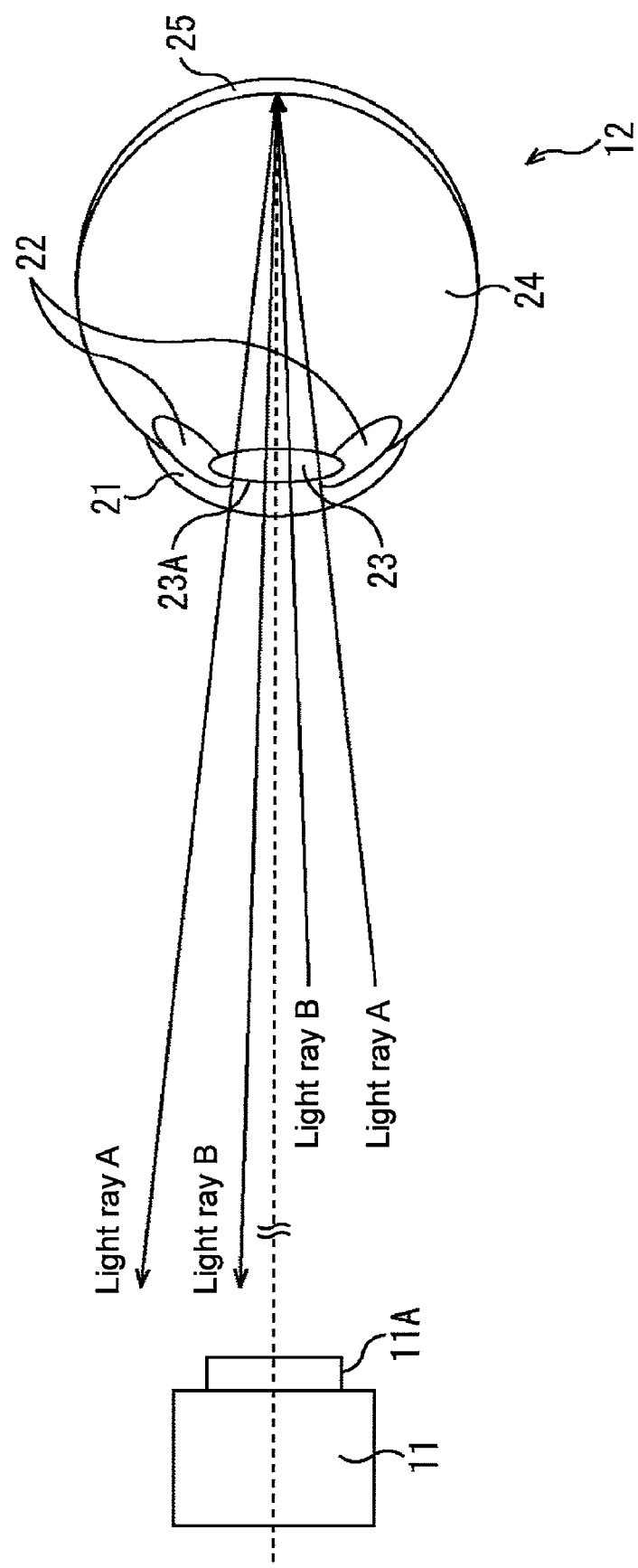
FIG. 1 shows a view for describing red-eye effect.

FIG. 1 shows a view schematically showing a relationship of an imaging device 11, an eyeball 12 of a human being, and a light ray entering the eyeball 12.

When imaging a human (hereinafter also referred to as a subject person) by the imaging device 11, red-eye effect in which the eye of the subject person appears red may occur when a strobe light or the like is radiated. The red-eye effect is an effect that occurs when the light ray such as the strobe light entered to the eyeball 12 transmits through a cornea 21, a crystalline lens 23, and a vitreous body 24, reaches the capillary vessel of a retina 25 (and choroid membrane (not shown)), and the red light which is the reflected light is imaged by the imaging device 11.

The conditions in which the red-eye effect occurs are considered. When a light ray A enters the eyeball 12 and reaches the retina 25, the light ray A is not regularly reflected and instead diffusely reflected in various directions. If a shift between a direction of an optical axis (hereinafter referred to as a lens optical axis or an imaging optical axis) of a lens 11A of the imaging device 11 and a direction of an optical axis of the light ray A is large, and the incident angle of the light ray A to the eyeball 12 is large, most of the light rays are reflected in a direction deviated from the lens optical axis and do not enter the lens 11A of the imaging device 11, and thus the red-eye effect is less likely to occur. If the direction of the optical axis is close to the direction of the lens optical axis of the imaging device 11 and a light ray B, which incident angle to the eyeball 12 is small, enters the eyeball 12 and reaches the retina 25, most of the reflected light is reflected in a direction close to the lens optical axis and entered to the lens 11A of the imaging device 11, and thus the red-eye effect is likely to occur. That is, the red-eye effect is likely to occur the closer the direction of the lens optical axis of the imaging device 11 and the direction of the optical axis of the light ray entering the eyeball 12. Therefore, the direction of the lens optical axis of the imaging device 11 and the direction of the optical axis of the illumination light become closer the closer the distance between the imaging device 11 and an illumination device of strobe and the like, and the red-eye effect is likely to occur.

A distance between the optical axis of the imaging device (lens optical axis) and a light source (more specifically, center of light source) of the illumination device used in imaging is hereinafter referred to as an inter-optical axis distance.

FIG. 2 shows a view schematically showing a relationship between an inter-optical axis distance Da between the imaging device 11 and the illumination device (not shown), and a subject distance Dp between the imaging device 11 and the subject person. Line A1 shows the lens optical axis of the imaging device 11, and line A2 shows an optical axis of the illumination light entering the retina 25 of the subject person of the illumination lights of the illumination device (not shown).

Generally, it is known that the red-eye effect is induced when the inter-optical axis distance Da becomes smaller than or equal to about 1/20 of the subject distance Dp (more specifically, distance between the center of the lens 11A of the imaging device 11 and the retina of the subject person) barely irrespective of the individual difference in the subject person. Conversely, the red-eye effect is induced when the subject distance Dp becomes greater than or equal to about 20 times the inter-optical axis distance Da (this value is hereinafter referred to as a red eye constant αr). This is a case where an angle θa between the lens optical axis A1 of the imaging device 11 and the optical axis A2 of the illumination light is smaller than or equal to about 2.86°.

Therefore, the relationship between the inter-optical distance Da and the subject distance Dp, and the presence of occurrence of the red-eye effect can be shown in a table such as in FIG. 3. The subject distance Dp (unit: mm) is shown at the top of the table of FIG. 3, and the inter-optical axis distance Da (unit: mm) is shown at the side of the table. In each column of the table, whether or not the red-eye effect occurs is shown in the combination of the inter-optical axis distance Da and the subject distance Dp corresponding to the relevant column, where a circle is marked in the column where the red-eye effect occurs, and no mark is described in the column where the red-eye effect does not occur. For instance, the red-eye effect occurs when the inter-optical axis distance Da is 10 mm and the subject distance Dp is 200 mm, and the red-eye effect does not occur when the inter-optical axis distance Da is 50 mm and the subject distance Dp is 400 mm.

Thus, the presence of occurrence of the red-eye effect can be modeled by the relationship of the inter-optical axis distance Da and the subject distance Dp irrespective of the individual difference of the subject person. The individual difference may appear in strong and weak of the red-eye effect due to the color of an iris, and the like, but this is a very small difference and is not an extent of influencing the presence of occurrence of the red-eye effect. Therefore, the subject distance Dp can be estimated if the presence of occurrence of the red-eye effect and the inter-optical axis distance Da are known. In one or more embodiments of the present invention, the subject distance between the imaging device and the subject person is measured using the red-eye effect, which is a biological reaction, using the principle described above.

As described above, the red-eye effect occurs when the lens 11A and the position of illumination (not shown) are close, and the diffusely reflected light of the retina 25 returns to the lens. Therefore, the red-eye effect has a possibility of occurring as long as the retina 25 (≅pupil 23A) appears in the imaging device 11 regardless of the direction of a line of sight of the subject person. That is, the red-eye effect may occur even if the subject person moves the face or the eyeball 12 and averts the line of sight from the lens 11A if at the angle the retina 25 (≅pupil 23A) appears in the imaging device 11. The direction of the line of sight may be defined with the direction of the eyeball 12, or the total angle of the direction of the eyeball 12+direction of the face.

The term "red eye" originates from the fact that the eye of a human being is imaged red due to the effect described above, but other animals such as cats may have a color other than red. This is because the reflected light of the tissue called the tapetum behind the retina is not necessarily red. However, since tapetum does not exist in human beings, every human being will have a red color (color of blood). The red-eye effect refers to an effect in which the color of the eye is changed by the reflected light of the light entered into the eyeball, and imaged (or observed) irrespective of the type of color.

Returning to FIG. 1, when a visible light ray continuously enters the eyeball 12, the pupil 23A contracts by the muscle of the iris 22, and the light quantity that reaches the retina 25 is adjusted, and thus the red-eye effect is less likely to occur. The reaction to light of a human being takes about 0.2 second from when the eye is irradiated with the light until the contraction of the pupil 23A is started, and about one second until the contraction of the pupil 23A is completed, and thus the contraction of the pupil 23A does not occur on time for the instantaneous light ray such as a strobe light and the red-eye effect easily occurs. The contraction of a pupil 63A does not occur even if the eye is irradiated with an infrared light, which is not visible to human being, and thus the red-eye effect continuously occurs when the infrared light is continuously radiated. In the infrared image imaged in this case, the color of the red-eye effect is white. Furthermore, since the light ray reflectivity of the retina 25 is higher in the infrared light region than in the visible light region, the red-eye effect significantly appears when the infrared light is radiated rather than when the visible light is radiated.

Figure 5:
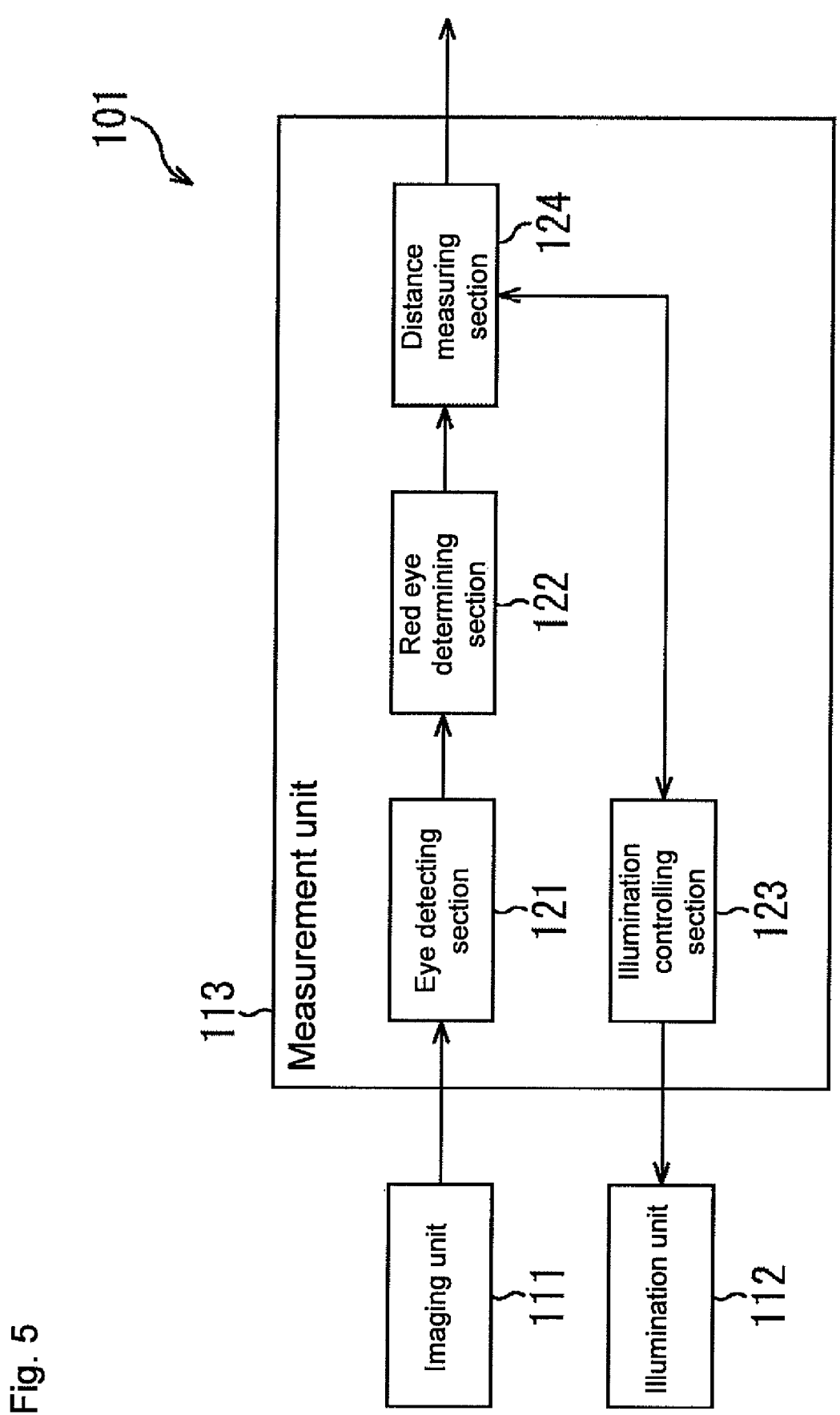
FIG. 5 shows a block diagram showing a functional configuration of the imaging device of FIG. 4.

A first embodiment of the present invention will now be described with reference to FIGS. 4 to 8. FIG. 4 shows a schematic view showing a configuration example of an outer appearance of an imaging device 101, and FIG. 5 shows a block diagram showing a functional configuration of the imaging device 101. The imaging device 101 is configured to include an imaging unit 111, an illumination unit 112, and a measurement unit 113.

The imaging unit 111 is configured by a camera capable of imaging an infrared light using such as a CCD (Charge Coupled Devices) imaging element, a CMOS (Complementary Metal Oxide Semiconductor) imaging element, or a logarithmic conversion-type imaging element. The imaging unit 111 provides an image (hereinafter referred to as an input image) in which a subject is imaged to the measurement unit 113.

The illumination unit 112 is arranged on the left side facing the front surface of the imaging unit 111 so that a light source L which emits the infrared light configured by an LED (Light Emitting Diode) and the like is at substantially the same height as a lens 111A of the imaging unit 111. The illumination unit 112 has the light source L turned on based on a control of the measurement unit 113, and irradiates the direction the imaging unit 111 images.

The measurement unit 113 connected to a back surface of the imaging unit 111 is configured by a CPU (Central Processing Unit), a memory, or the like, and measures the distance between a human (subject person) imaged by the imaging unit 111 and the imaging unit 111. The functions including an eye detecting section 121, a red eye determining section 122, an illumination controlling section 123, and a distance measuring section 124 are realized by having the CPU of the measurement unit 113 execute a predetermined control program.

The eye detecting section 121 detects a region of the eye of the subject person appeared on the input image using a predetermined method, and provides the input image and the information indicating the detection result to the red eye determining section 122.

The red eye determining section 122 determines whether or not the red-eye effect has occurred at the eye of the subject person detected by the eye detecting section 121 using a predetermined method, and provides the information indicating the determination result to the distance measuring section 124.

The illumination controlling section 123 controls lighting and non-lighting of the light source L of the illumination unit 112 based on a command from the distance measuring section 124. The illumination controlling section 123 provides the information indicating the inter-optical axis distance Da between the imaging unit 111 and the light source L to the distance measuring section 124.

The distance measuring section 124 measures the subject distance between the imaging unit 111 and the subject person based on the presence of occurrence of the red-eye effect and the inter-optical axis distance. The distance measuring section 124 outputs the information indicating the measurement result of the subject distance to the post-stage.

Figure 6:
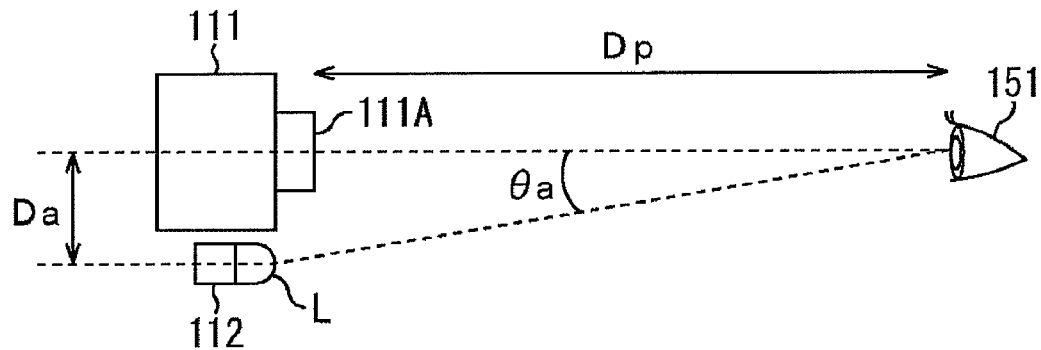
FIG. 6 shows a view for describing the principle of measuring a subject distance by the imaging device of FIG. 4.

The principle of measuring the subject distance by the imaging device 101 will be briefly described with reference to FIG. 6. As described above with reference to FIG. 2, the presence of occurrence of the red-eye effect at the eye 151 of the subject person when the light source L is turned on depends on the subject distance Dp between the imaging unit 111 and the eye 151 of the subject person, and the inter-optical axis distance Da between the imaging unit 111 and the light source L (or incident angle θa to the eye 151 of the illumination light from the light source L with respect to the lens optical axis of the imaging unit 111). That is, subject distance Dp≧inter-optical axis distance Da×red eye constant αr can be estimated when the red-eye effect occurred at the eye 151 of the subject person when the light source L is turned on, and subject distance Dp<inter-optical axis distance Da×red eye constant αr can be estimated when the red-eye effect has not occurred.

The details of a subject distance measurement process executed by the imaging device 101 will be described based on the above principle with reference to a flowchart of FIG. 7.

In step S1 the imaging device 101 lights the illumination. That is, the illumination controlling section 123 turns on the light source L of the illumination unit 112 based on a command from the distance measuring section 124.

In step S2, the measurement unit 113 performs a red eye determination process. The details of the red eye determination process will be described with reference to a flowchart of FIG. 8.

In step S21, the eye detecting section 121 acquires an input image. That is, the eye detecting section 121 acquires from the imaging unit 111 the input image imaged by the imaging unit 111 with the light source L turned on, in other words, the input image in which the subject irradiated with the illumination light emitted from the light source L is imaged.

In step S22, the eye detecting section 121 performs an eye region detection process. Specifically, the eye detecting section 121 first searches for the face of a human in the input image based on a predetermined method. If the face of a human is detected in the input image, the eye detecting section 121 performs the detection process of a region of the eye (e.g., region surrounded by four points of outer corner of the eye, inner corner of the eye, middle of the top lid, middle of the bottom lid) of the detected human (subject person) based on a predetermined method. The method of the eye region detection process used herein is not limited to a specific method, and a method of detecting the region of the eye of the human in the input image more accurately, more rapidly, and more easily is desirably applied.

In step S23, the eye detecting section 121 determines whether or not the detection of the eye region is successful based on the result of the process of step S22. For instance, if the region of the eye of the human cannot be detected in the input image as the face of the person is not in the input image, the face of the person is in the input image but is looking away, or the eye is closed, the eye detecting section 121 determines that the detection of the eye region has failed and the process returns to step S21. Thereafter the processes of steps S21 to S23 are repeatedly executed until the detection of the eye region is determined as successful in step S23.

When determined that the detection of the eye region is successful in step S23, the process proceeds to step S24.

In step S24, the red eye determining section 122 determines the presence of occurrence of the red-eye effect. Specifically, the eye detecting section 121 provides to the red eye determining section 122 the input image, and the information indicating the position of the eye of the subject person in the input image. The red eye determining section 122 determines whether or not the red-eye effect has occurred at the eye of the subject person of the input image detected by the eye detecting section 121 based on a predetermined method. The red eye determining section 122 provides the information indicating the determination result to the distance measuring section 124. The red eye determination process is thereafter terminated.

The method of determining the presence of occurrence of the red-eye effect used herein is not limited to a specific method, and a method of determining the presence of occurrence of the red-eye effect more accurately, more rapidly, and more easily is desirably applied. For instance, according to a grayscale distribution of luminance of low-resolution face image, the region of the eye is observed to be darker than the region of the skin. Thus, when specifying the region of the eye, and the pixels of greater than or equal to a predetermined luminance exist more than a threshold value in the specified region of the eye, the red-eye effect is determined as occurring. The threshold value of the number of pixels can be set with the proportion of the iris diameter occupying the region of the eye, and the like as a reference. In another example, the red-eye effect can be detected by detecting an edge pattern (e.g., ellipse of a rugby ball shape) close to the shape of the eye from the edge extracted from the face image, and finding a hollow circular edge in the pattern. It is apparent that the above two methods and other methods may obviously be combined for use.

Returning to FIG. 7, in step S3, the distance measuring section 124 acquires the information indicating the inter-optical axis distance Da between the imaging unit 111 and the illumination unit 112 from the illumination controlling section 123.

In step S4, the distance measuring section 124 determines whether or not the red-eye effect has occurred based on the determination result by the red eye determining section 122. The process proceeds to step S5 if determined that the red-eye effect has occurred.

In step S5, the distance measuring section 124 determines that subject distance Dp≧inter-optical axis distance Da×red eye constant αr.

In step S6, the distance measuring section 124 performs a post-process. For instance, the luminance of the red-eye effect in the input image changes by the distance from the light source L and the incident angle of the illumination light to the eye of the subject person from the light source L. The distance measuring section 124 acquires the information indicating the luminance of the red-eye effect in the input image from the red eye determining section 122, as necessary, and estimates the subject distance Dp at finer precision based on the acquired luminance information to correct the subject distance Dp. The distance measuring section 124 outputs the information indicating the measurement result of the subject distance Dp to the post-stage. The subject distance measurement process is thereafter terminated If determined that the red-eye effect has not occurred in step S4, the process proceeds to step S7.

In step S7, the distance measuring section 124 determines that subject distance Dp<inter-optical axis distance Da×red eye constant αr. The distance measuring section 124 outputs the information indicating the measurement result of the subject distance Dp to the post-stage. The subject distance measurement process is thereafter terminated.

The subject distance between the imaging unit 111 and the subject person can be measured based on the presence of occurrence of the red-eye effect, and the inter-optical axis distance between the imaging unit 111 and the light source L in the above manner. In particular, since the red-eye effect, which is a biological reaction of humans, is used, objects other than humans are not influenced and the subject distance can be reliably measured. Furthermore, since there is barely any individual difference in the occurrence conditions of the red-eye effect, the subject distance can be measured without being influenced by the individual difference even without performing a special calibration. Moreover, in recent years, many imaging devices have a red eye detecting function and a red eye correcting function, where the an embodiment of the present invention can be realized by a simple configuration by simply adding change to a simple circuit, software, or the like without arranging a dedicated distance measurement device and the like.

A second embodiment of the present invention will now be described with reference to FIGS. 9 to 12. In the second embodiment of the present invention, the number of light sources is increased to two so that the subject distance can be measured in more detail.

Figure 9:
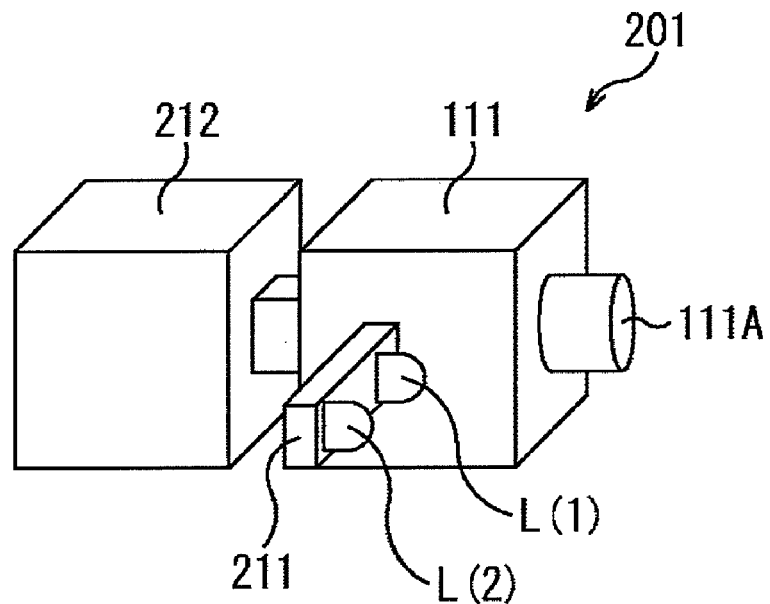
FIG. 9 shows a schematic view showing a configuration example of an outer appearance of an imaging device according to an embodiment of the present invention.
Figure 10:
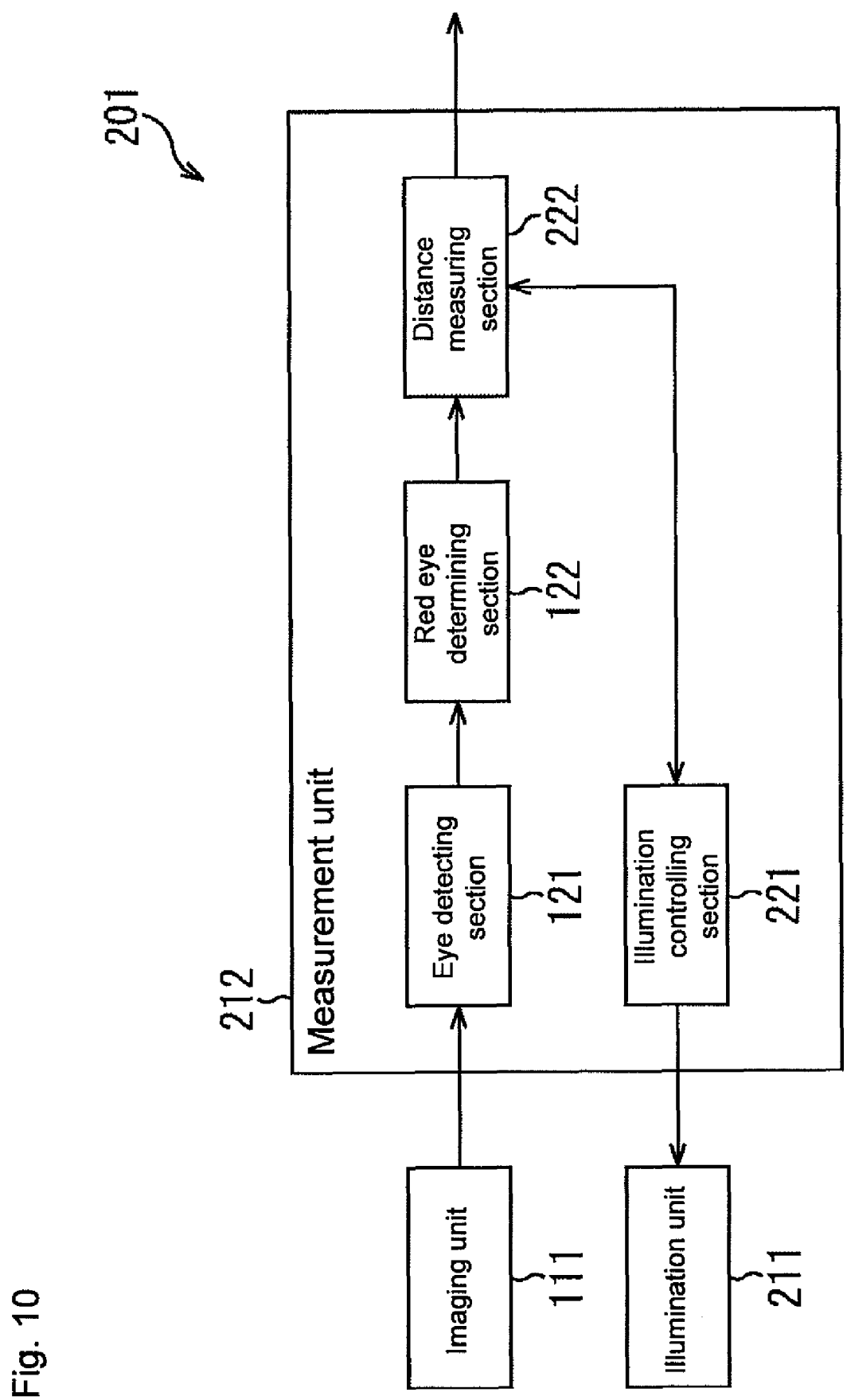
FIG. 10 shows a block diagram showing a functional configuration of the imaging device of FIG. 9.

FIG. 9 shows a schematic view showing a configuration example of an outer appearance of an imaging device 201, and FIG. 10 shows a block diagram showing a functional configuration of the imaging device 201. The imaging device 201 is configured to include the imaging unit 111, an illumination unit 211, and a measurement unit 212. The functions including the eye detecting section 121, the red eye determining section 122, an illumination controlling section 221, and a distance measuring section 222 are realized by having the CPU of the measurement unit 212 execute a predetermined control program. In the figure, same reference numerals are denoted for the portions corresponding to FIGS. 4 and 5, and the description on the portion of the same process is not given to avoid repetition.

The illumination unit 211 includes two light sources L(1) and L(2) which emit an infrared light configured by an LED (Light Emitting Diode) and the like. The illumination unit 211 is arranged on the left side facing the front surface of the imaging unit 111 so that the light source L(1) and the light source L(2) are lined in the horizontal direction and are at substantially the same height as the lens 111A, where the light source L(1) is close to and the light source L(2) is distant from the imaging unit 111. The illumination unit 211 has the light source L(1) and the light source L(2) respectively turned on independently based on a control of the illumination controlling section 221, and irradiates the direction the imaging unit 111 images.

The measurement unit 212 connected to a back surface of the imaging unit 111 is configured by a CPU (Central Processing Unit), a memory, or the like, and measures the distance between a human (subject person) imaged by the imaging unit 111 and the imaging unit 111.

The illumination controlling section 221 controls lighting and non-lighting of the light source L(1) and the light source L(2) of the illumination unit 211 based on a command from the distance measuring section 222. The illumination controlling section 221 provides the information indicating the inter-optical axis distance between the imaging unit 111 and the light source L(1) or the light source L(2) to the distance measuring section 222.

The distance measuring section 222 measures the subject distance between the imaging unit 111 and the subject person based on the presence of occurrence of the red-eye effect and the inter-optical axis distance. The distance measuring section 222 outputs the information indicating the measurement result of the subject distance to the post-stage.

Figure 11:
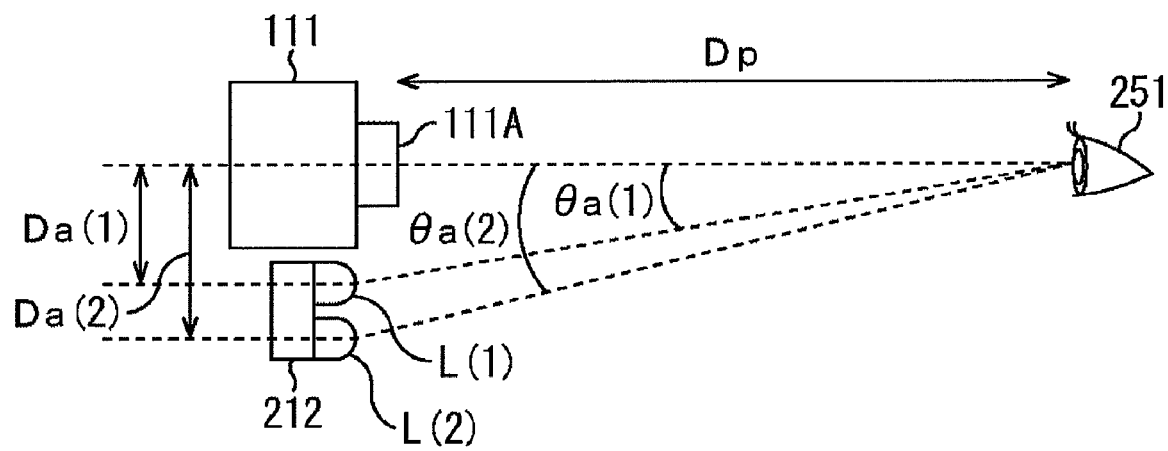
FIG. 11 shows a view for describing the principle of measuring a subject distance by the imaging device of FIG. 9.

The principle of measuring the subject distance by the imaging device 201 will be briefly described with reference to FIG. 11. As described above with reference to FIG. 2, the presence of occurrence of the red-eye effect at the eye 251 of the subject person when the light source L(1) is turned on depends on the subject distance Dp between the imaging unit 111 and the eye 251 of the subject person, and an inter-optical axis distance Da(1) between the imaging unit 111 and the light source L(1) (or incident angle θa(1) to the eye 251 of the illumination light from the light source L(1) with respect to the lens optical axis of the imaging unit 111). Similarly, the presence of occurrence of the red-eye effect at the eye 251 of the subject person when the light source L(2) is turned on depends on the subject distance Dp between the imaging unit 111 and the eye 251 of the subject person, and an inter-optical axis distance Da(2) between the imaging unit 111 and the light source L(2) (or incident angle θa(2) to the eye 251 of the illumination light from the light source L(2) with respect to the lens optical axis of the imaging unit 111).

Since inter-optical axis distance Da(1)<inter-optical axis distance Da(2), when the light source L(1) and the light source L(2) are turned on individually under the same condition, the red-eye effect may occur by both light sources, the red-eye effect may not occur by both light sources (=when red-eye effect does not occur by the light source L(1)), or the red-eye effect may occur by only the light source L(1). When the red-eye effect occurs by both light sources, subject distance Dp≧inter-optical axis distance Da(2)×red eye constant αr can be estimated; when the red-eye effect does not occur by both light sources, subject distance Dp<inter-optical axis distance Da(1)×red eye constant αr can be estimated; and when the red-eye effect occurs by only the light source L(1), inter-optical axis distance Da(1)×red eye constant αr≦subject distance Dp>inter-optical axis distance Da(2)×red eye constant αr can be estimated.

The subject distance measurement process executed by the imaging device 201 will be described based on the above principle with reference to a flowchart of FIG. 12.

In step S41, the imaging device 201 turns on the light source L(1). That is, the illumination controlling section 221 turns on the light source L(1) of the illumination unit 211 based on a command from the distance measuring section 222.

Figure 7:
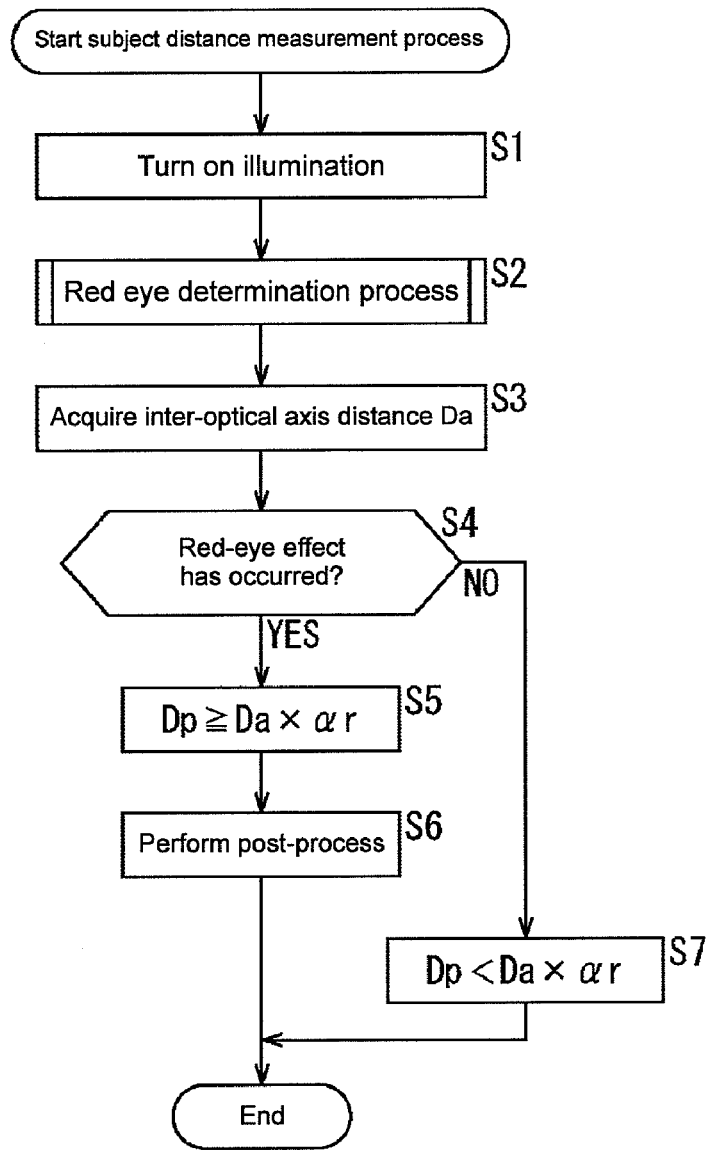
FIG. 7 shows a flowchart for describing a subject distance measurement process executed by the imaging device of FIG. 4.

In step S42, the red eye determination process similar to step S2 of FIG. 7 is executed. The presence of occurrence of the red-eye effect when the light source L(1) is turned on is determined.

In step S43, the distance measuring section 222 acquires the information indicating the inter-optical axis distance Da(1) between the imaging unit 111 and the light source L(1) of the illumination unit 211 from the illumination controlling section 221.

In step S44, whether or not the red-eye effect has occurred is determined similar to the process of step S4 of FIG. 7. The process proceeds to step S45 if determined that the red-eye effect has occurred.

In step S45, the imaging device 201 turns on the light source L(2). That is, the illumination controlling section 221 turns off the light source L(1) and turns on the light source L(2) of the illumination unit 211 based on a command from the distance measuring section 222.

In step S46, the red eye determination process similar to step S2 of FIG. 7 is executed. Thus, the presence of occurrence of the red-eye effect when the light source L(2) is turned on is determined.

In step S47, the distance measuring section 222 acquires the information indicating the inter-optical axis distance Da(2) between the imaging unit 111 and the light source L(2) of the illumination unit 211 from the illumination controlling section 221.

In step S48, whether or not the red-eye effect has occurred is determined similar to the process of step S4 of FIG. 7. If determined that the red-eye effect has occurred, that is when the red-eye effect occurred by both the light source L(1) and the light source L(2), the process proceeds to step S49.

In step S49, the distance measuring section 22 determines that subject distance Dp≧inter-optical axis distance Da(2)×red eye constant αr. The process proceeds to step S51 thereafter.

If determined that the red-eye effect has not occurred in step S48, that is, when the red-eye effect occurred by only the light source L(1), the process proceeds to step S50.

In step S50, the distance measuring section 222 determines that inter-optical axis distance Da(1)×red eye constant αr≦subject distance Dp<inter-optical axis distance Da(2)×red eye constant αr. The process proceeds to step S51 thereafter.

In step S51, the post-process is performed, similar to the process of step S6 of FIG. 7, and the subject distance measurement process is terminated.

If determined that the red-eye effect has not occurred in step S44, that is, when the red-eye effect did not occur by the light source L(1), the process proceeds to step S52.

In step S52, the distance measuring section 222 determines that subject distance Dp<inter-optical axis distance Da(1)×red eye constant αr. The distance measuring section 222 outputs the information indicating the measurement result of the subject distance Dp to the post-stage. The subject distance measurement process is thereafter terminated.

The subject distance is thus measured in more detail compared to the first embodiment of the present invention.

A third embodiment of the present invention will now be described with reference to FIGS. 13 to 15. In the third embodiment of the present invention, the number of light sources is further increased so that the subject distance can be measured in more detail.

Figure 13:
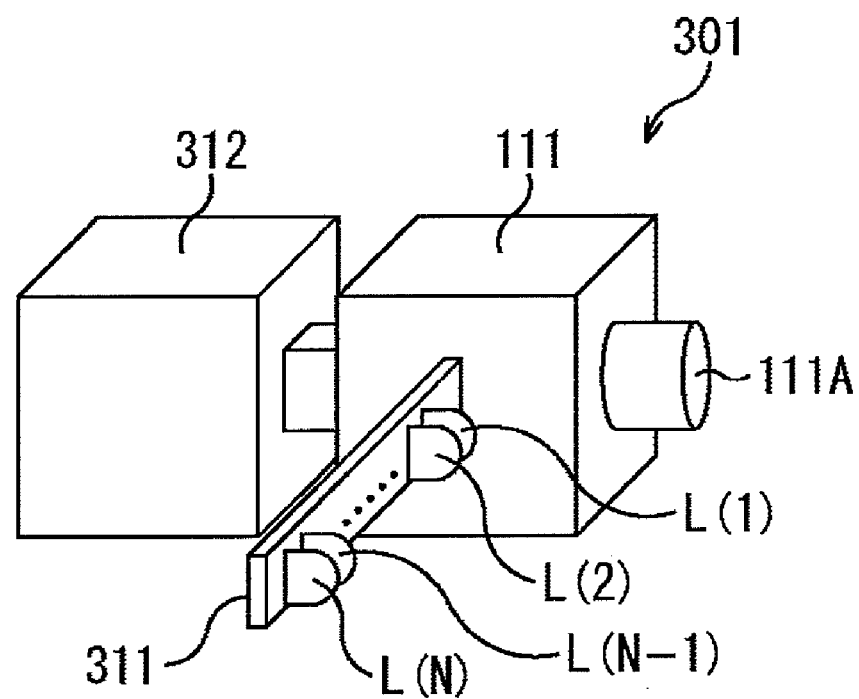
FIG. 13 shows a schematic view showing a configuration example of an outer appearance of an imaging device according on an embodiment of the present invention.
Figure 14:
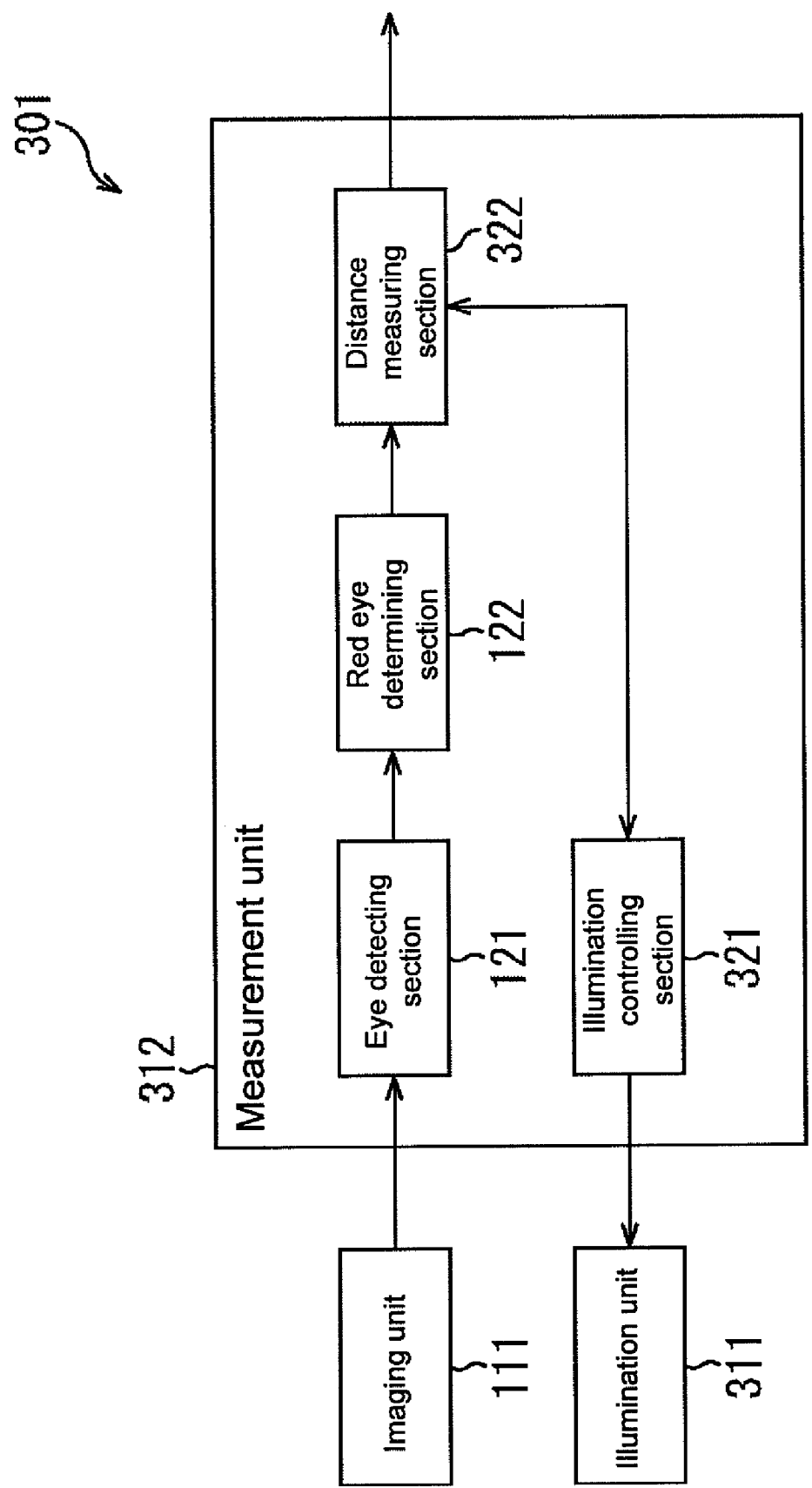
FIG. 14 shows a block diagram showing a functional configuration of the imaging device of FIG. 13.

FIG. 13 shows a schematic view showing a configuration example of an outer appearance of an imaging device 301, and FIG. 14 shows a block diagram showing a functional configuration of the imaging device 301. The imaging device 301 is configured to include the imaging unit 111, an illumination unit 311, and a measurement unit 312. The functions including the eye detecting section 121, the red eye determining section 122, an illumination controlling section 321, and a distance measuring section 322 are realized by having the CPU of the measurement unit 312 execute a predetermined control program. In the figure, same reference numerals are denoted for the portions corresponding to FIGS. 4 and 5, and the description on the portion of the same process is not given to avoid repetition.

The illumination unit 311 includes N light sources L(1) to L(N) which emit an infrared light configured by an LED (Light Emitting Diode) and the like, where the light sources L(1) to L(N) are arranged at substantially equal interval in the horizontal direction. The illumination unit 311 is arranged on the left side facing the front surface of the imaging unit 111 so that the light sources L(1) to L(N) are lined in the horizontal direction and are at substantially the same height as the lens 111A, where the light source L(1) is the closest to the imaging unit 111 and the light source L(N) is the farthest from the imaging unit 111. The illumination unit 311 has the light source L(1) to the light source L(N) respectively turned on independently based on a control of the illumination controlling section 321, and irradiates the direction the imaging unit 111 images.

The inter-optical axis distance between the imaging unit 111 and the light source L(i) (i=1, 2, ..., N) is Da(i) (i=1, 2, ..., N) below.

The measurement unit 312 connected to a back surface of the imaging unit 111 is configured by a CPU (Central Processing Unit), a memory, or the like, and measures the subject distance between a subject person imaged by the imaging unit 111 and the imaging unit 111.

The illumination controlling section 321 controls lighting and non-lighting of the light source L(1) to the light source L(N) of the illumination unit 311 based on a command from the distance measuring section 322. The illumination controlling section 321 provides the information indicating the inter-optical axis distance between the imaging unit 111 and the lighted light source to the distance measuring section 322.

The distance measuring section 322 measures the subject distance between the imaging unit 111 and the subject person based on the presence of occurrence of the red-eye effect and the inter-optical axis distance. The distance measuring section 322 outputs the information indicating the measurement result of the subject distance to the post-stage.

The subject distance measurement process executed by the imaging device 301 will be described with reference to a flowchart of FIG. 15.

In step S71, the distance measuring section 322 substitutes 0 to a variable i.

In step S72, the distance measuring section 322 increments the value of the variable i by one.

In step S73, the illumination controlling section 321 turns off the light source L(i−1) of the illumination unit 311 and turns on the light source L(i) based on the command from the distance measuring section 322. Only the lighting of the light source L(1) is carried out at the start of the process.

In step S74, the red eye determination process similar to step S2 of FIG. 7 is executed. The presence of occurrence of the red-eye effect when the light source L(i) is turned on is determined.

In step S75, the distance measuring section 322 acquires the information indicating the inter-optical axis distance Da(i) between the imaging unit 111 and the lighted light source L(i) from the illumination controlling section 321.

In step S76, whether or not the red-eye effect has occurred is determined similar to the process of step S4 of FIG. 7. The process proceeds to step S77 if determined that the red-eye effect has occurred.

In step S77, the distance measuring section 322 determines whether or not the variable i is equal to N. The process returns to step S72 if determined that the variable i is not equal to N.

Thereafter, the processes of steps S72 to S77 are repeatedly executed until determined that the red-eye effect has not occurred in step S76 or until determined that the variable i is equal to N in step S77. That is, whether or not the red-eye effect occurs by each light source is determined while switching one by one the light source to turn on in the direction of the light source L(1) to the light source L(N).

If determined that the variable i is equal to N in step S77, the process proceeds to step S78. This is when the red-eye effect occurred by all the light sources from the light source L(1) to the light source L(N).

In step S78, the distance measuring section 322 determines that subject distance Dp≧inter-optical axis distance Da(N)× red eye constant αr. The distance measuring section 322 outputs the information indicating the measurement result of the subject distance Dp to the post-stage. The subject distance measurement process is thereafter terminated.

If determined that the red-eye effect has not occurred in step S76, the process proceeds to step S79.

In step S79, the distance measuring section 322 determines whether or not the variable i is equal to one. If determined that the variable i is equal to one, the process proceeds to step S80. This is when the red-eye effect did not occur by the light source L(1) closest to the imaging unit 111.

In step S80, the distance measuring section 322 determines that subject distance Dp<inter-optical axis distance Da(1)× red eye constant αr. The distance measuring section 322 outputs the information indicating the measurement result of the subject distance Dp to the post-stage. The subject distance measurement process is thereafter terminated.

If determined that the variable i is not equal to one in step S79, the process proceeds to step S81. This is when the red-eye effect occurred up to the light source L(i−1) one before the light source L(i) currently being lighted, and the red-eye effect no longer occurred with the light source L(i).

In step S79, the distance measuring section 322 determines that inter-optical axis distance Da(i−1)×red eye constant αr≦subject distance Dp<inter-optical axis distance Da(i)× red eye constant αr. That is, the range of the subject distance is obtained based on the inter-optical axis distance Da(i−1) of the light source L(i−1) farthest from the optical axis of the imaging unit 111 of the light sources with which the red-eye effect occurred, and the inter-optical axis distance Da(i) of the light source L(i) closest to the optical axis of the imaging unit 111 of the light sources with which the red-eye effect did not occur. The distance measuring section 322 outputs the information indicating the measurement result of the subject distance Dp to the post-stage. The subject distance measurement process is thereafter terminated.

The subject distance is thus measured in more detail compared to the first and second embodiments of the present invention.

Figure 15:
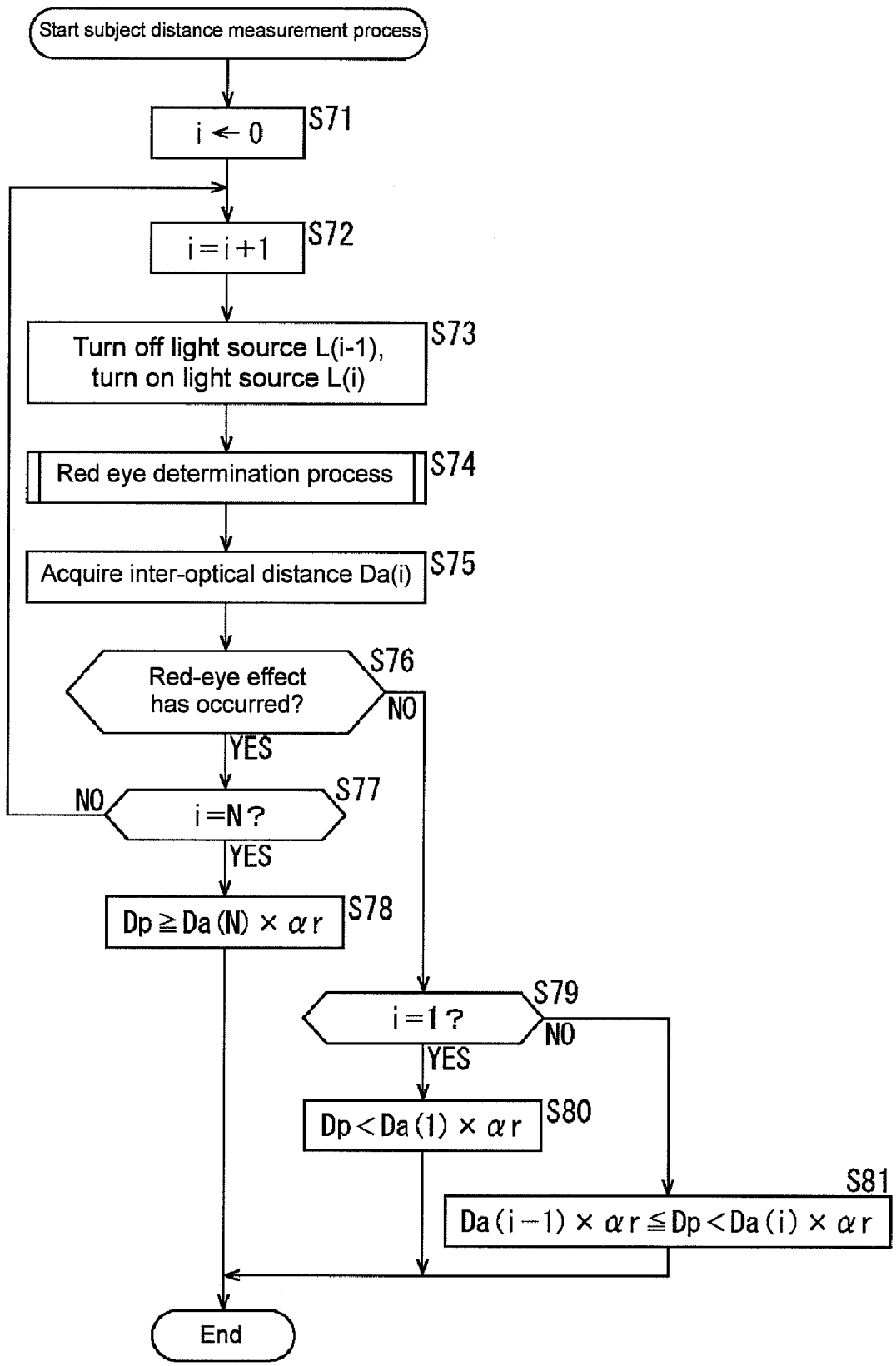
FIG. 15 shows a flowchart for describing a subject distance measurement process executed by the imaging device of FIG. 13.

In the flowchart of FIG. 15, the post process (e.g., process of step S6 of FIG. 7) after the subject distance is determined is not given to simplify the description, but the post process may, of course, be applied to the process of the flowchart of FIG. 15.

A fourth embodiment of the present invention will be described with reference to FIGS. 16 to 19. In the fourth embodiment of the present invention, the number of light sources is increased not only in the horizontal direction but also in the vertical direction so that the subject distance can be measured in more detail.

Figure 16:
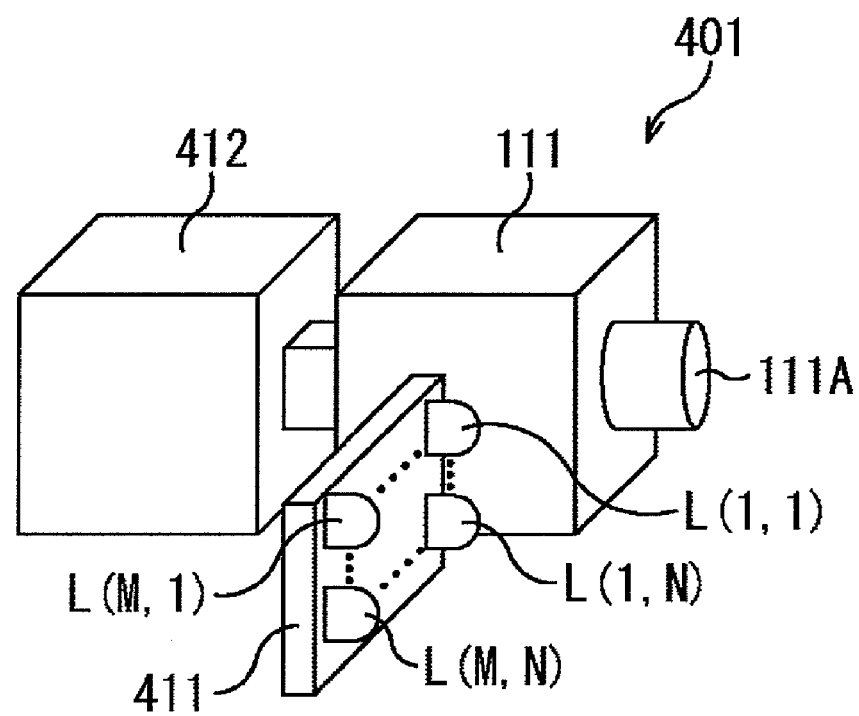
FIG. 16 shows a schematic view showing a configuration example of an outer appearance of an imaging device according to an embodiment of the present invention.
Figure 17:
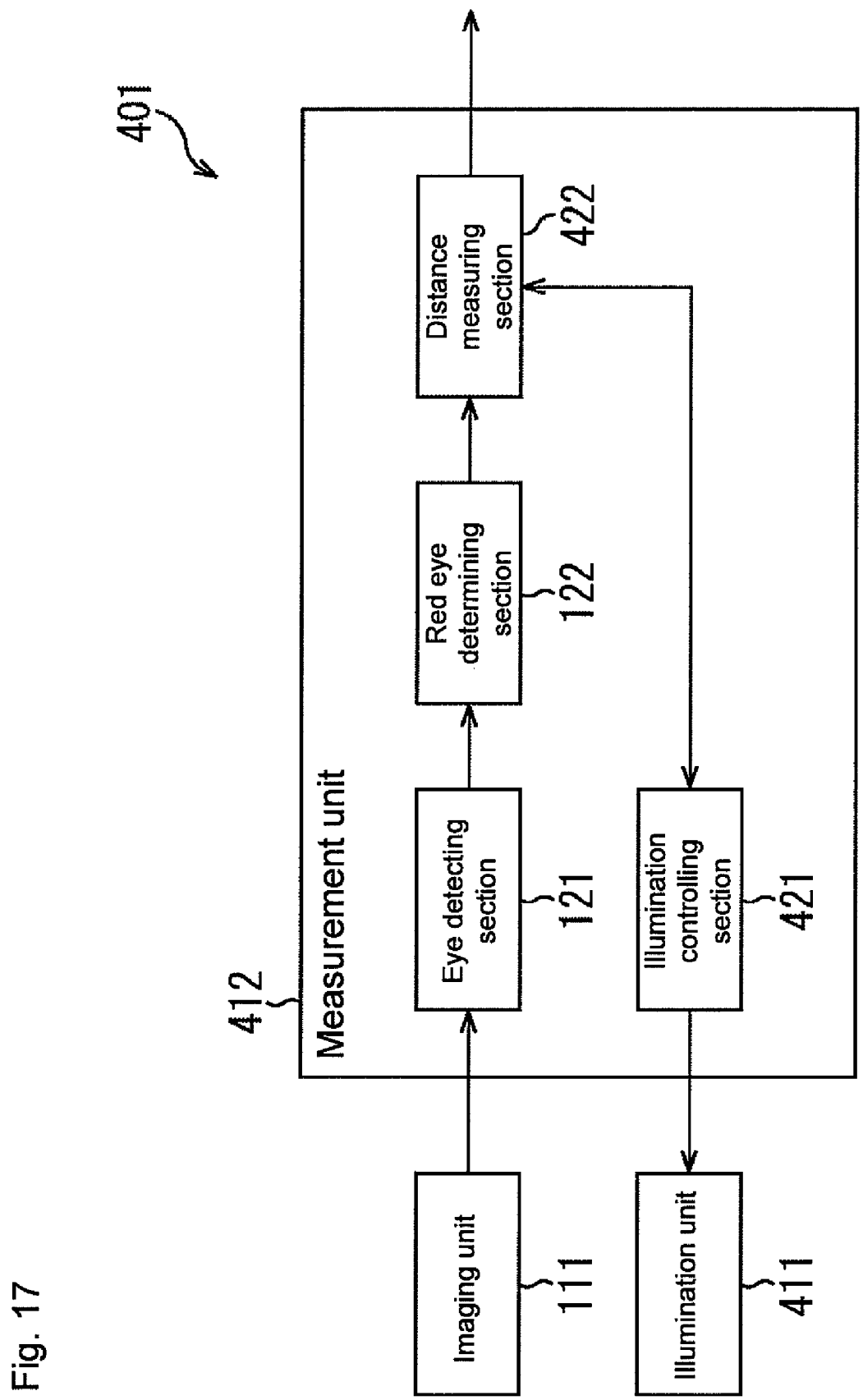
FIG. 17 shows a block diagram showing a functional configuration of the imaging device of FIG. 16.

FIG. 16 shows a schematic view showing a configuration example of an outer appearance of an imaging device 401, and FIG. 17 shows a block diagram showing a functional configuration of the imaging device 401. The imaging device 401 is configured to include the imaging unit 111, an illumination unit 411, and a measurement unit 412. The functions including the eye detecting section 121, the red eye determining section 122, an illumination controlling section 421, and a distance measuring section 422 are realized by having the CPU of the measurement unit 412 execute a predetermined control program. In the figure, same reference numerals are denoted for the portions corresponding to FIGS. 4 and 5, and the description on the portion of the same process is not given to avoid repetition.

The illumination unit 411 includes M×N light sources L(1, 1) to L(M,N) which emit an infrared light configured by an LED (Light Emitting Diode) and the like, where the light sources L(1,1) to L(M,N) are arranged in a lattice form. The interval in the horizontal direction and the interval in the vertical direction of the light sources do not necessarily need to be the same. The illumination unit 411 is arranged on the left side facing the front surface of the imaging unit 111 so that the height of the light source on the uppermost row becomes substantially the same height as the lens 111A, where the light source L(1,1) is the closest to the imaging unit 111 and the light source L(M,N) is the farthest from the imaging unit 111.

The inter-optical axis distance between the imaging unit 111 and the light source L(i,j) (i=1, 2, . . . , M; j=1, 2, . . . , N) is Da(i,j) (i=1, 2, . . . , M; j=1, 2, . . . , N) below. Furthermore, inter-optical distance Da(j,N) of the lowermost light source L(j,N) in $j^{th}$ column<inter-optical axis distance Da(j+1,1) of the upper most light source L(j+1,1) of the $j+1^{st}$ column. Therefore, Da(j,1)<Da(j,2)< . . . <Da(j,M−1)<Da(j,M)<Da(j+1,1).

The measurement unit 412 connected to a back surface of the imaging unit 111 is configured by a CPU (Central Processing Unit), a memory, or the like, and measures the subject distance between a subject person imaged by the imaging unit 111 and the imaging unit 111.

The illumination controlling section 421 controls lighting and non-lighting of the light source L(1,1) to the light source L(M,N) of the illumination unit 411 based on a command from the distance measuring section 422. The illumination controlling section 421 provides the information indicating the inter-optical axis distance between the imaging unit 111 and the lighted light source to the distance measuring section 422.

The distance measuring section 422 measures the subject distance between the imaging unit 111 and the subject person based on the presence of occurrence of the red-eye effect and the inter-optical axis distance. The distance measuring section 422 outputs the information indicating the measurement result of the subject distance to the post-stage.

The subject distance measurement process executed by the imaging device 401 will be described with reference to a flowchart of FIGS. 18 and 19.

In step S101, the distance measuring section 422 substitutes 0 to a variable i, and substitutes 1 to a variable j.

In step S102, the distance measuring section 422 increments the value of the variable i by one.

In step S103, the illumination controlling section 421 turns off the light source L(i−1,1) of the illumination unit 411 and turns on the light source L(i,1) based on the command from the distance measuring section 422. Only the lighting of the light source L(1,1) is carried out at the start of the process.

In step S104, the red eye determination process similar to step S2 of FIG. 7 is executed. The presence of occurrence of the red-eye effect when the light source L(i,1) is turned on is determined.

In step S105, the distance measuring section 422 acquires the information indicating the inter-optical axis distance Da(i,1) between the imaging unit 111 and the lighted light source L(i,1) from the illumination controlling section 421.

In step S106, whether or not the red-eye effect has occurred is determined similar to the process of step S4 of FIG. 7. The process proceeds to step S107 if determined that the red-eye effect has occurred.

In step S107, the distance measuring section 422 determines whether or not the variable i is equal to M. The process returns to step S102 if determined that the variable i is not equal to M.

Thereafter, the processes of steps S102 to S107 are repeatedly executed until determined that the red-eye effect has not occurred in step S106 or until determined that the variable i is equal to M in step S107. That is, whether or not the red-eye effect occurs by each light source in the first row of the illumination unit 411 is determined while switching one by one the light source to turn on in the direction of the light source L(1,1) to the light source L(M,1).

If determined that the variable i is equal to M in step S107, the process proceeds to step S108. This is when the red-eye effect has occurred by all the light sources (from light source L(1,1) to light source L(M,1)) in the first row of the illumination unit 411.

In step S108, the distance measuring section 422 substitutes M to a variable X. Thereafter, the process proceeds to step S111.

If determined that the red-eye effect has not occurred in step S106, the process proceeds to step S109.

In step S109, the distance measuring section 422 determines whether or not the variable i is equal to 1. The process proceeds to step S110 if determined that the variable i is not equal to 1. This is when the red-eye effect occurred up to the light source L(i−1,1) one left to the light source L(i,1) currently being lighted, and the red-eye effect no longer occurred with the light source L(i,1).

In step S110, the distance measuring section 422 substitutes i−1 to the variable X. Thereafter, the process proceeds to step S111.

In step S111, the distance measuring section 422 increments the value of the variable j by one.

In step S112, the illumination controlling section 421 turns off the light source L(X,j−1) of the illumination unit 411 and turns on the light source L(X,j) based on the command from the distance measuring section 422. In the first process of step S112, the lighted light source in the first row of the illumination unit 411 is turned off, and the light source L(X,2) is turned on. The variable X represents the column farthest from the imaging unit 111 of the columns in which the red-eye effect occurred in the red eye determination process with respect to the light sources in the first row of the illumination unit 411 of steps S102 to S107.

In step S113, the red eye determination process similar to step S2 of FIG. 7 is executed. The presence of occurrence of the red-eye effect when the light source L(X,j) is turned on is determined.

In step S114, the distance measuring section 422 acquires the information indicating the inter-optical axis distance Da(X,j) between the imaging unit 111 and the lighted light source L(X,j) from the illumination controlling section 421.

In step S115, whether or not the red-eye effect has occurred is determined similar to the process of step S4 of FIG. 7. The process proceeds to step S116 if determined that the red-eye effect has occurred.

In step S116, the distance measuring section 422 determines whether or not the variable j is equal to N. The process returns to step S111 if determined that the variable j is not equal to N.

Thereafter, the processes of steps S111 to S116 are repeatedly executed until determined that the red-eye effect has not occurred in step S115 or until determined that the variable j is equal to M in step S116. That is, whether or not the red-eye effect occurs by each light source in the $X^{th}$ column of the illumination unit 411 is determined while switching one by one the light source to turn on in the direction of the light source L(X,2) to the light source L(X,N).

If determined that the variable j is equal to N in step S116, the process proceeds to step S117.

In step S117, the distance measuring section 422 determines whether or not the variable X is equal to M. The process proceeds to step S118 if determined that the variable X is equal to M. This is when the red-eye effect occurred by all the light sources of the illumination unit 411 from the light source L(1,1) to the light source L(M,N).

In step S118, the distance measuring section 422 determines that subject distance Dp≧inter-optical axis distance Da(M,N)×red eye constant αr. The distance measuring section 422 outputs the information indicating the measurement result of the subject distance Dp to the post-stage. The subject distance measurement process is thereafter terminated.

If determined that the variable X is not equal to M in step S117, the process proceeds to step S119. This is when the red-eye effect occurred by all the light sources in the $X^{th}$ column of the illumination unit 411 from the light source L(X,1) to the light source L(X,N), and the red-eye effect did not occur by the light source L(X+1,1) in the first row of the $X+1^{st}$ column.

In step S119, the distance measuring section 422 determines that inter-optical axis distance Da(X,N)×red eye constant αr≦subject distance Dp<inter-optical axis distance Da(X+1,1)×red eye constant αr. That is, the range of the subject distance is obtained based on the inter-optical axis distance Da(X,N) of the light source L(X,N) farthest from the optical axis of the imaging unit 111 of the light sources with which the red-eye effect occurred, and the inter-optical axis distance Da(X+1,1) of the light source L(X+1,1) closest to the optical axis of the imaging unit 111 of the light sources with which the red-eye effect did not occur. The distance measuring section 422 outputs the information indicating the measurement result of the subject distance Dp to the post-stage. The subject distance measurement process is thereafter terminated.

If determined that the red-eye effect has not occurred in step S115, the process proceeds to step S120. This is when the red-eye effect occurred up to the light source L(X,j−1) one above the light source L(X,j) currently being lighted from the light source L(X,1) in the first row, and the red-eye effect no longer occurred with the light source L(X,j) for the light sources in the $X^{th}$ column of the illumination unit 411.

In step S120, the distance measuring section 422 determines that inter-optical axis distance Da(X,j−1)×red eye constant αr≦subject distance Dp<inter-optical axis distance Da(X,j)×red eye constant αr. That is, the range of the subject distance is obtained based on the inter-optical axis distance Da(X,j−1) of the light source L(X,j−1) farthest from the optical axis of the imaging unit 111 of the light sources with which the red-eye effect occurred, and the inter-optical axis distance Da(X,j) of the light source L(X,j) closest to the optical axis of the imaging unit 111 of the light sources with which the red-eye effect did not occur. The distance measuring section 422 outputs the information indicating the measurement result of the subject distance Dp to the post-stage. The subject distance measurement process is thereafter terminated.

If determined that the variable i is equal to one in step S109, the process proceeds to step S121. This is when the red-eye effect did not occur by the light source L(1,1) closest to the imaging unit 111.

In step S121, the distance measuring section 422 determines that subject distance Dp<inter-optical axis distance Da(1,1)×red eye constant αr. The distance measuring section 422 outputs the information indicating the measurement result of the subject distance Dp to the post-stage. The subject measurement process is thereafter terminated.

Thus, the subject distance can be measured in further detail compared to the first to third embodiments of the present invention. In other words, the range of the subject distance is roughly narrowed down by first measuring the subject distance while switching the light source to turn on in the horizontal direction, and then the range of the subject distance is finely narrowed down by measuring the subject distance while switching the light source to turn on in the vertical direction.

It is possible to specify the column farthest from the imaging unit 111 of the columns with which the red-eye effect occurs by switching the column to light the light source while lighting all the light sources in one column in the vertical direction, and then turning on the light source in the relevant column while switching one by one to finely narrow down the subject distance.

As the light sources are lined not only in the horizontal direction but also in the vertical direction, the presence of occurrence of the red-eye effect can be checked in detail by turning on the light source close to the head even if the head of the subject person moves up and down. Therefore, although the determination of the subject distance is performed at the point the occurrence of the red-eye effect is not detected in the above description, the subject distance can be more accurately measured by always determining the presence of occurrence of the red-eye effect for all the light sources.

The measurement accuracy of the subject distance can be enhanced by increasing the number of light sources in the illumination unit to have a dense arrangement of the light sources. That is, the interval of the inter-optical axis distance between each light source becomes narrower the denser the arrangement of the light sources, whereby the measurement interval of the subject distance can be shortened.

Figure 18:
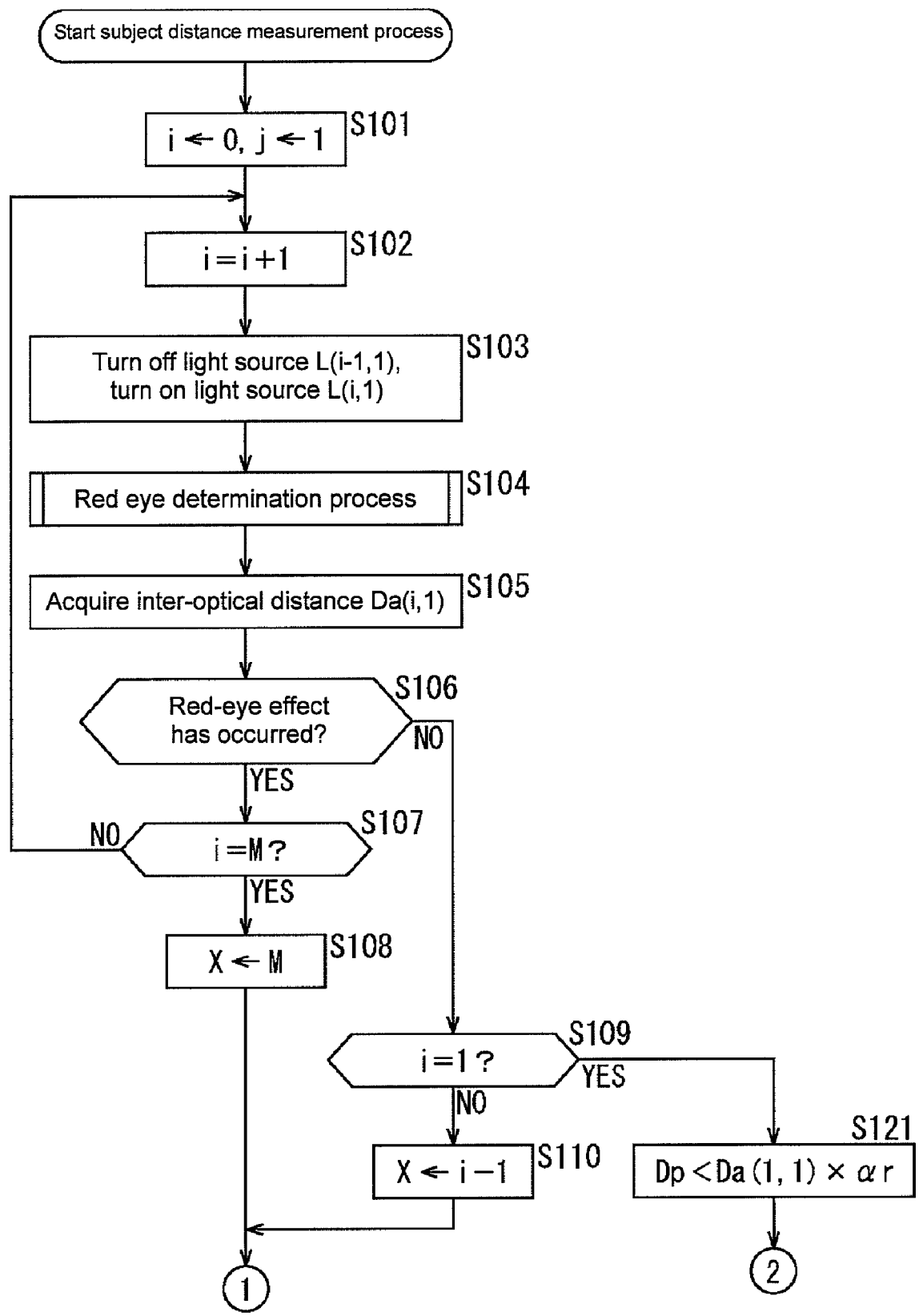
FIG. 18 shows a flowchart for describing a subject distance measurement process executed by the imaging device of FIG. 16.
Figure 19:
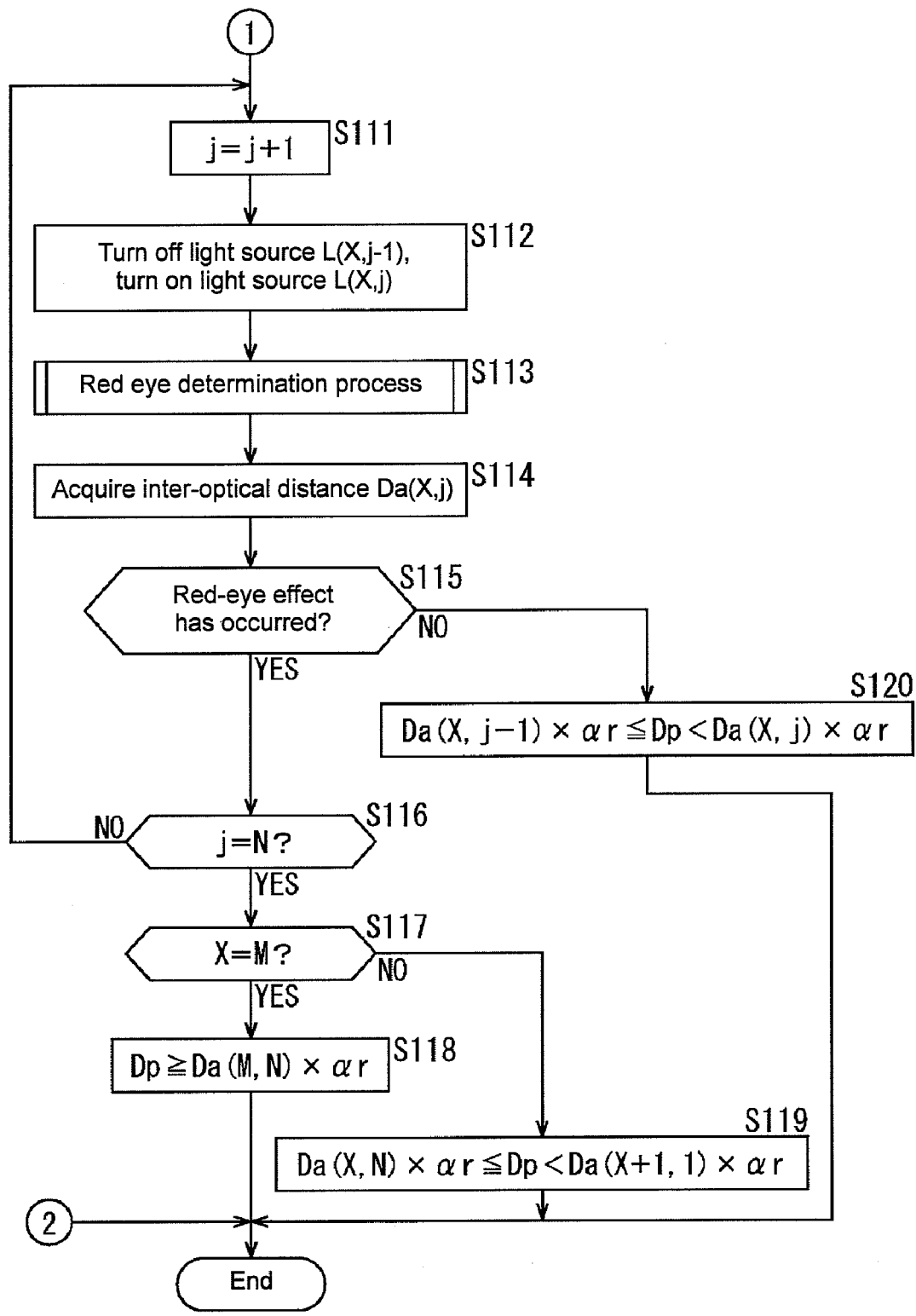
FIG. 19 shows a flowchart for describing the subject distance measurement process executed by the imaging device of FIG. 16.

In the flowcharts of FIGS. 18 and 19, the post process (e.g., process of step S6 of FIG. 7) after the subject distance is determined is not given to simplify the description, but the post process may, of course, be applied to the process of the flowcharts of FIGS. 18 and 19.

In the above description, the subject distance is always confirmed when the occurrence of the red-eye effect is not detected, but the occurrence of the red-eye effect is not detected when the subject person is looking away and the pupil of the subject person cannot be imaged, or when the pupil of the subject person is contracting as the outside light is too bright. In such cases, the occurrence of the red-eye effect is not detected irrespective of the relationship of the inter-optical axis distance and the subject distance, and thus a large error may arise in the measured subject distance. Therefore, in such cases, it is desirable to have the subject distance as unconfirmed.

FIG. 20 shows an example of a reference for determining whether or not to confirm the subject distance when the occurrence of the red-eye effect is not detected. Specifically, FIG. 20 shows an example of whether or not to confirm the subject distance according to the combination of the angle (hereinafter referred to as a face direction angle) of the direction of the face of the subject person with respect to the lens optical axis of the imaging unit and the brightness of the outside light.

For instance, if the face direction angle is smaller than a predetermined threshold value and the outside light is darker than the brightness at which the person contracts the pupil (hereinafter also simply referred to as when outside light is dark), it is assumed that the red-eye effect has not occurred since the subject distance is close with respect to the inter-optical axis distance, and the subject distance is confirmed. If the face direction angle is greater than or equal to a predetermined threshold value, or if the outside light is the brightness at which the person contracts the pupil (hereinafter also simply referred to as when outside light is bright), the subject distance is unconfirmed.

Specifically, if the face direction angle is smaller than the predetermined threshold value and the outside light is bright, it is assumed that the red-eye effect has not occurred since the pupil of the subject person is contracting by the outside light, and the subject distance is unconfirmed. Furthermore, if the face direction angle is greater than or equal to the predetermined threshold value and the outside light is dark, the pupil of the subject person does not appear on the input image as the subject person is looking away, and thus it is assumed that the presence of occurrence of the red-eye effect is not accurately checked, and the subject distance is unconfirmed. If the face direction angle is greater than or equal to the predetermined threshold value and the outside light is bright, it is assumed that the presence of occurrence of the red-eye effect is not accurately checked as the subject person is looking away, or that the red-eye effect has not occurred as the pupil of the subject person is contracting, and the subject distance is not confirmed.

A fifth embodiment of the present invention will be described with reference to FIGS. 21 to 24. The fifth embodiment of the present invention is obtained by adding a process of determining whether or not to confirm the subject distance when the red-eye effect has not occurred to the first embodiment of the present invention.

Figure 21:
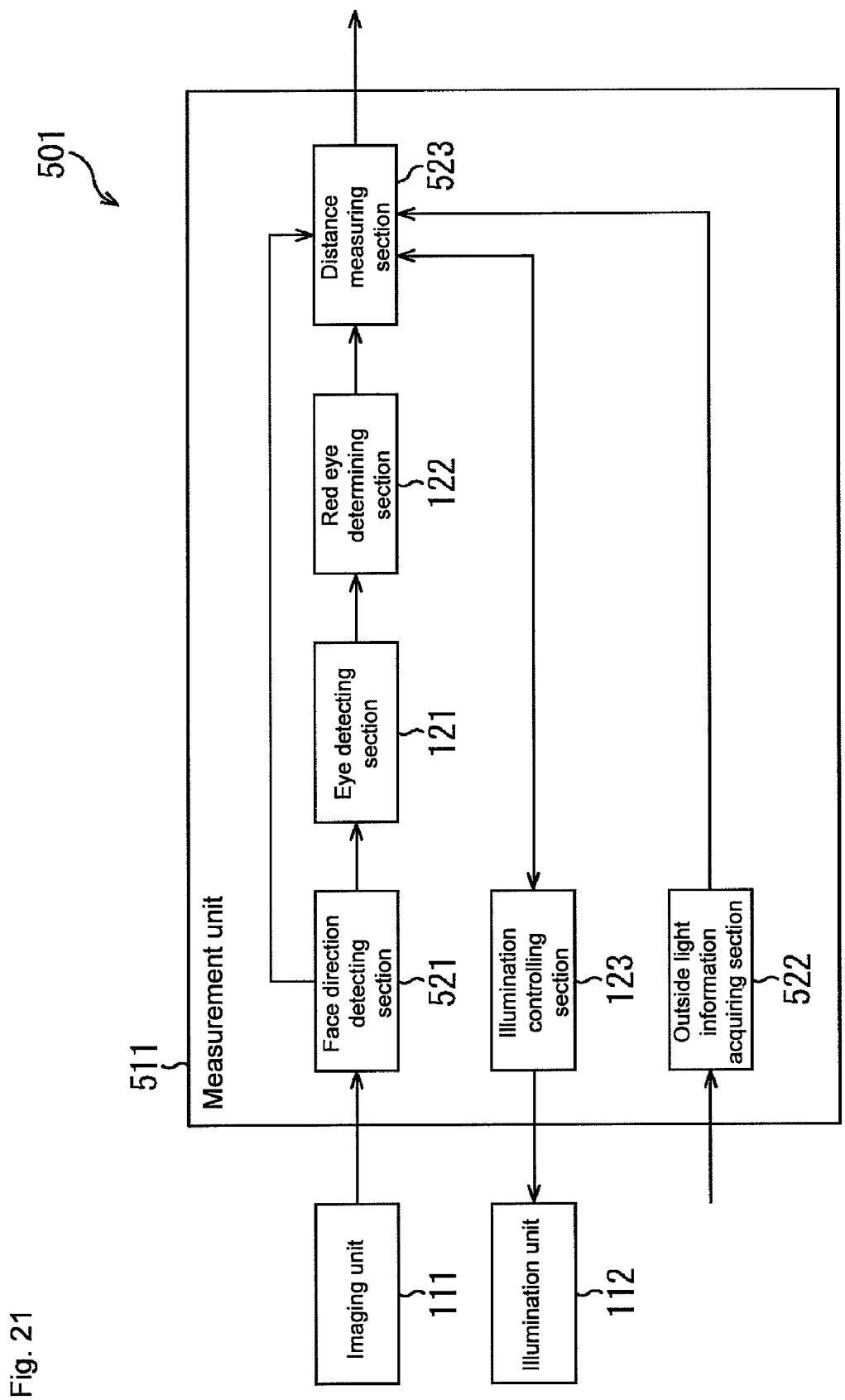
FIG. 21 shows a block diagram showing a function configuration of an imaging device according to an embodiment of the present invention.

FIG. 21 shows a block diagram showing a function configuration of an imaging device 501. The imaging device 501 is configured to include the imaging unit 111, the illumination unit 112, and a measurement unit 511. The functions including a face direction detecting section 521, the eye detecting section 121, the red eye determining section 122, the illumination controlling section 123, an outside light information acquiring section 522, and a distance measuring section 523 are realized by having the CPU of the measurement unit 511 execute a predetermined control program. In the figure, same reference numerals are denoted for portions corresponding to FIG. 5, and the description on the portion of the same process is not given to avoid repetition.

The face direction detecting section 521 performs a detection process of an angle (face direction angle) of the direction of the face of the subject person in the input image with respect to the lens optical axis of the imaging unit 111 using a predetermined method. The face direction detecting section 521 provides the input image to the eye detecting section 121 when succeeding in the detection of the face direction angle of the subject person. The face direction detecting section 521 also determines whether or not the detected face direction angle is greater than or equal to a predetermined threshold value (e.g., 60°), and provides the determination result to the distance measuring section 523.

As hereinafter described with reference to FIG. 22, the outside light information acquiring section 522 acquires the information related to the state of the outside light other than the illumination light of the illumination unit 112. The outside light information acquiring section 522 determines whether or not the outside light is the brightness the person contracts the pupil based on the acquired information, and provides the information indicating the determination result to the distance measuring section 523.

The distance measuring section 523 measures the subject distance between the imaging unit 111 and the subject person based on the presence of occurrence of the red-eye effect and the inter-optical axis distance. The distance measuring section 523 also determines whether or not to confirm the subject distance based on the determination result of the face direction detecting section 521 and the determination result of the outside light information acquiring section 522 when determined that the red-eye effect has not occurred. The distance measuring section 523 outputs the information indicating the measurement result of the subject distance to the post-stage. When not confirming the subject distance, the distance measuring section 523 outputs the information indicating the cause to the post-stage. Furthermore, the distance measuring section 523 instructs the illumination controlling section 123 to turn on or turn off the light source L of the illumination unit 112.

The subject distance measurement process executed by the imaging device 501 will be described with reference to a flowchart of FIG. 22.

In step S201, the light source L of the illumination unit 112 is turned on by the process similar to step S1 of FIG. 7.

In step S202, the measurement unit 511 executes a face information acquisition process. The details of the face information acquisition process will be described with reference to a flowchart of FIG. 23.

In step S221, the face direction detecting section 521 acquires an input image. That is, the face direction detecting section 521 acquires from the imaging unit 111 the input image in which the subject irradiated with illumination light emitted from the light source L is imaged.

In step S222, the face direction detecting section 521 performs a face direction angle detection process. That is, the face direction detecting section 521 performs a process of detecting the face direction angle of the subject person based on the input image using a predetermined method. The method of the face direction angle detection process used here is not limited to a specific method, and a method capable of more accurately, more rapidly, and more easily detecting the face direction angle is desirably applied.

In step S223, the face direction detecting section 521 determines whether or not the detection of the face direction angle is successful based on the result of the process of step S222. If determined that the detection of the face direction angle failed, the process returns to step S221, and the processes of steps S221 to S223 are repeatedly executed until determined that the detection of the face direction angle is successful in step S223.

If determined that the detection of the face direction angle is successful in step S223, the process proceeds to step S224.

In step S224, the eye detecting section 121 performs the eye region detection process. Specifically, the face direction detecting section 521 provides the input image to the eye detecting section 121. The eye detecting section 121 performs the eye region detection process similar to the process of step S22 of FIG. 8.

In step S225, the eye detecting section 121 determines whether or not the detection of the eye region is successful based on the result of the process of step S224. If determined that the detection of the eye region failed, the process returns to step S221, and the processes of steps S221 to S225 are repeatedly executed until determined that the detection of the eye region is successful in step S225.

If determined that the detection of the eye region is successful in step S225, the process proceeds to step S226.

Figure 8:
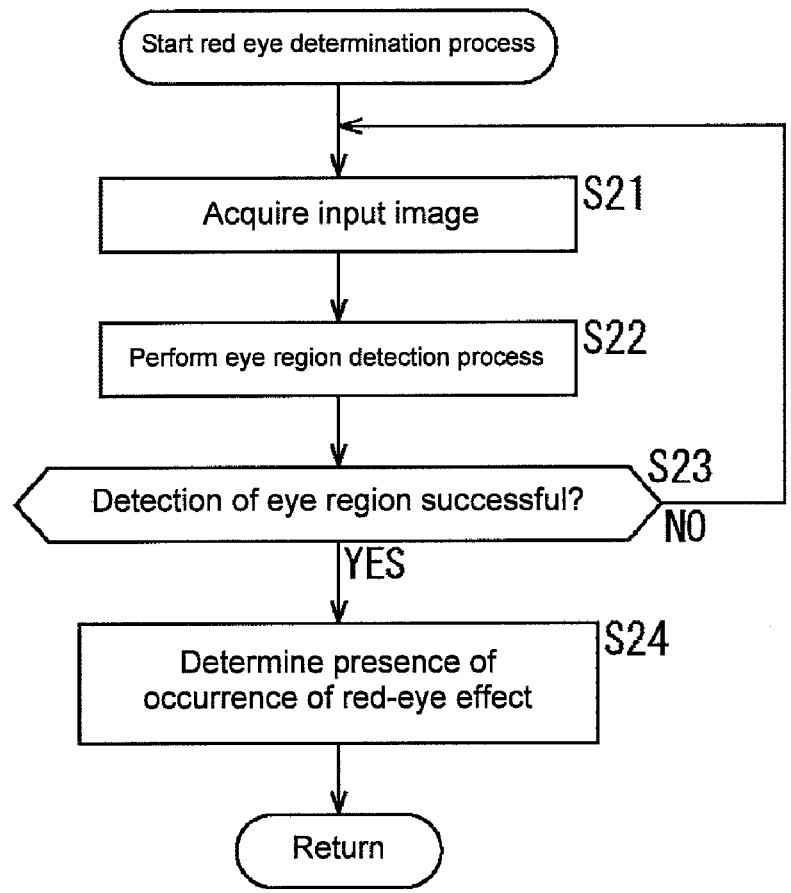
FIG. 8 shows a flowchart for describing details of a red eye determination process.

In step S226, the presence of occurrence of the red-eye effect is determined similar to the process of step S24 of FIG. 8. The face information acquisition process is thereafter terminated.

Returning to FIG. 22, in step S203, the outside light information acquiring section 522 acquires outside light information. For instance, the outside light information acquiring section 522 acquires the information related to the brightness of the outside light surrounding the subject person from a light receiving sensor (not shown). The outside light information acquiring section 522 compares the brightness of the outside light with a predetermined threshold value based on the acquired information, and determines whether or not the outside light is the brightness the person contracts the pupil. The threshold value is set to an average value of the brightness a person starts to contract the pupil. The outside light information acquiring section 522 provides the information indicating the determination result to the distance measuring section 523.

The information acquired by the outside light information acquiring section 522 and the method of determining the brightness of the outside light are not limited to specific information and method. For instance, if the imaging device 501 is mounted in the vehicle, the outside light information acquiring section 522 may acquire ON/OFF signal of a headlight of the vehicle, and use the same to determine the brightness of the outside light. The outside light information acquiring section 522 may acquire the input image imaged by the imaging unit 111 with the illumination light of the illumination unit 112 turned off, and detect the brightness of the outside light based on the luminance value and the like of each pixel of the acquired input image.

In step S204, the distance measuring section 523 acquires the information indicating the inter-optical axis distance Da from the illumination controlling section 123 similar to the process of step S3 of FIG. 7.

In step S205, the distance measuring section 523 executes the distance measurement process, and the subject distance measurement process is terminated. The details of the distance measurement process will be described with reference to a flowchart of FIG. 24.

In step S241, whether or not the red-eye effect has occurred is determined similar to the process of step S4 of FIG. 7. The process proceeds to step S242 if determined that the red-eye effect has occurred.

In step S242, subject distance Dp≧inter-optical axis distance Da×red eye constant αr is determined similar to the process of step S5 of FIG. 7, In step S243, the post process is performed similar to the process of step S6 of FIG. 7, and the distance measurement process is terminated.

If determined that the red-eye effect has not occurred in step S241, the process proceeds to step S244.

In step S244, the distance measuring section 523 determines whether or not the outside light is bright based on the determination result of the outside light information acquiring section 522. The process proceeds to step S245 if determined that the outside light is dark.

In step S245, the distance measuring section 523 determines whether or not the face direction angle is smaller than a predetermined threshold value based on the determination result of the face direction detecting section 521. The process proceeds to step S246 if determined that the face direction angle is smaller than the predetermined threshold value.

In step S246, the distance measuring section 523 determines that subject distance Dp<inter-optical axis distance Da×red eye constant αr. The distance measuring section 523 outputs the information indicating the measurement result of the subject distance Dp to post-stage. The distance measurement process is thereafter terminated.

If determined that the face direction angle is greater than or equal to the predetermined threshold value in step S245, the process proceeds to step S247.

In step S247, the distance measuring section 523 performs an exceptional process. Specifically, the distance measuring section 523 assumes that the presence of occurrence of the red-eye effect is not accurately recognized as the subject person looked away, and does not confirm the subject distance Dp. The distance measuring section 523 outputs the information indicating that the subject distance Dp is unconfirmed and that the cause is that the subject person looked away to the post-stage. The distance measurement process is thereafter terminated.

If determined that the outside light is bright in step S244, the process proceeds to step S248.

In step S248, the distance measuring section 523 performs an exceptional process. Specifically, the distance measuring section 523 assumes that the red-eye effect has not occurred due to the contraction of the pupil of the subject person by the outside light, and does not confirm the subject distance Dp. The distance measuring section 523 outputs the information indicating that the subject distance Dp is unconfirmed and that the cause is that the outside light is too bright to the post-stage. The distance measurement process is thereafter terminated.

A sixth embodiment of the present invention will be described with reference to FIGS. 25 to 28. The sixth embodiment of the present invention is obtained by adding a process of determining whether or not to confirm the subject distance when the red-eye effect has not occurred to the second embodiment of the present invention.

Figure 25:
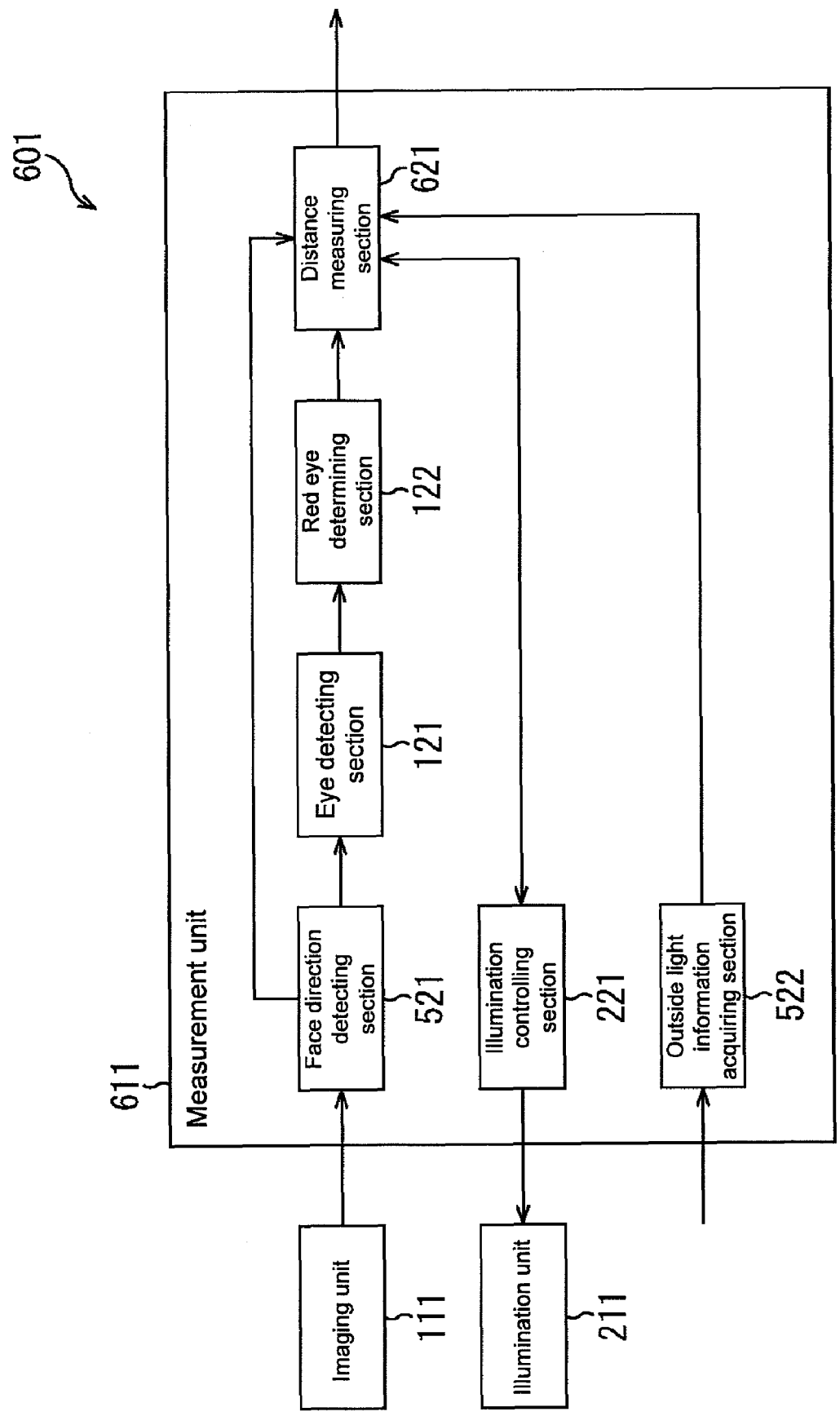
FIG. 25 shows a block diagram showing a function configuration of an imaging device according to an embodiment of the present invention.

FIG. 25 shows a block diagram showing a function configuration of an imaging device 601. The imaging device 601 is configured to include the imaging unit 111, the illumination unit 112, and a measurement unit 611. The functions including the face direction detecting section 5217 the eye detecting section 121, the red eye determining section 122, the illumination controlling section 221, the outside light information acquiring section 522, and a distance measuring section 621 are realized by having the CPU of the measurement unit 611 execute a predetermined control program. In the figure, same reference numerals are denoted for portions corresponding to FIG. 10 and FIG. 21, and the description on the portion of the same process is not given to avoid repetition.

The distance measuring section 621 measures the subject distance between the imaging unit 111 and the subject person based on the presence of occurrence of the red-eye effect and the inter-optical axis distance. The distance measuring section 621 also determines whether or not to confirm the subject distance based on the determination result of the face direction detecting section 521 and the determination result of the outside light information acquiring section 522 when determined that the red-eye effect has not occurred. The distance measuring section 621 outputs the information indicating the measurement result of the subject distance to the post-stage. When not confirming the subject distance, the distance measuring section 621 outputs the information indicating the cause to the post-stage. Furthermore, the distance measuring section 621 instructs the illumination controlling section 221 to turn on or turn off the light source L(1) and the light source L(2) of the illumination unit 211.

Figure 26:
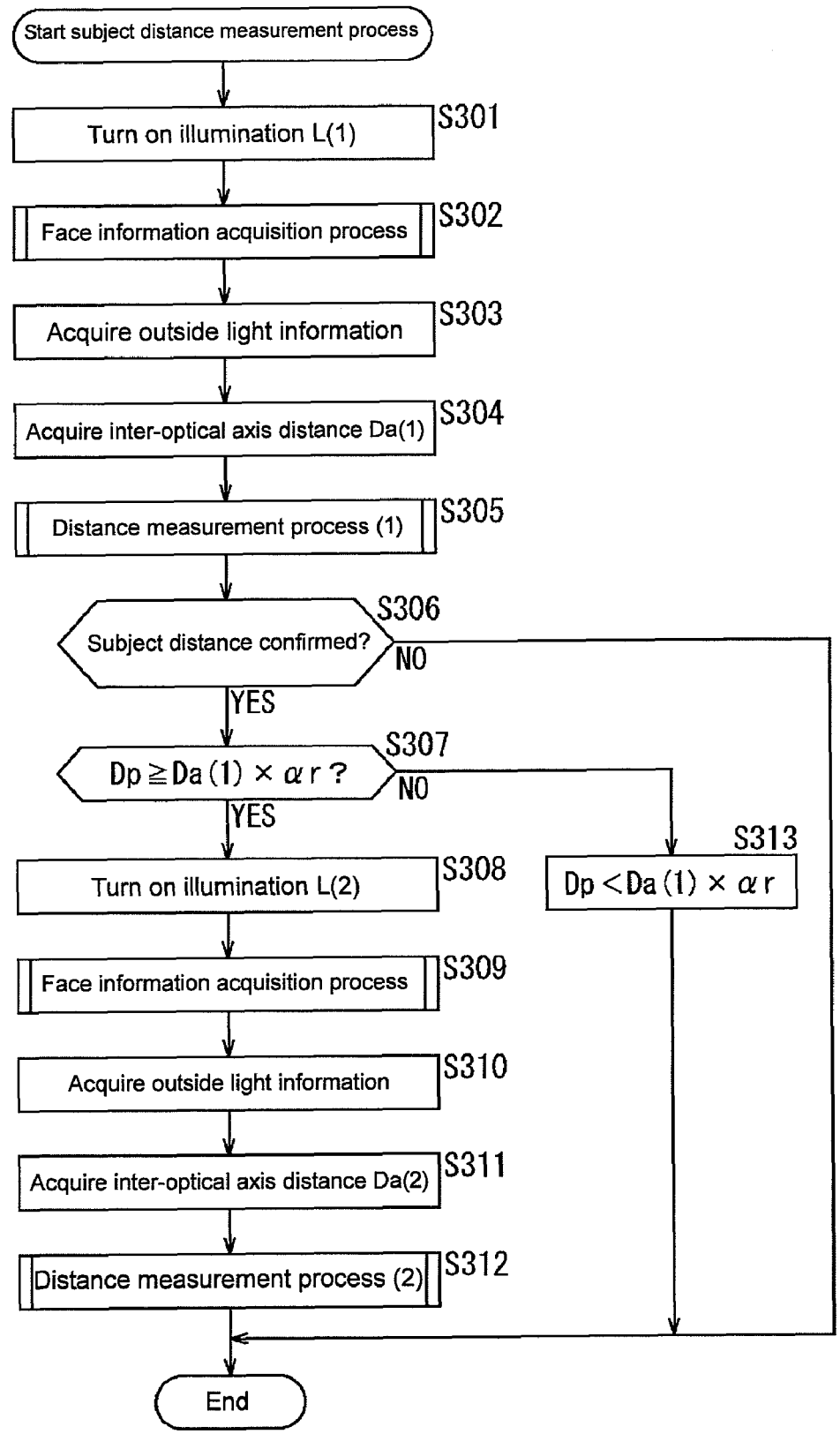
FIG. 26 shows a flowchart for describing a subject distance measurement process executed by the imaging device of FIG. 25.

The subject distance measurement process executed by the imaging device 601 will be described with reference to a flowchart of FIG. 26.

Figure 12:
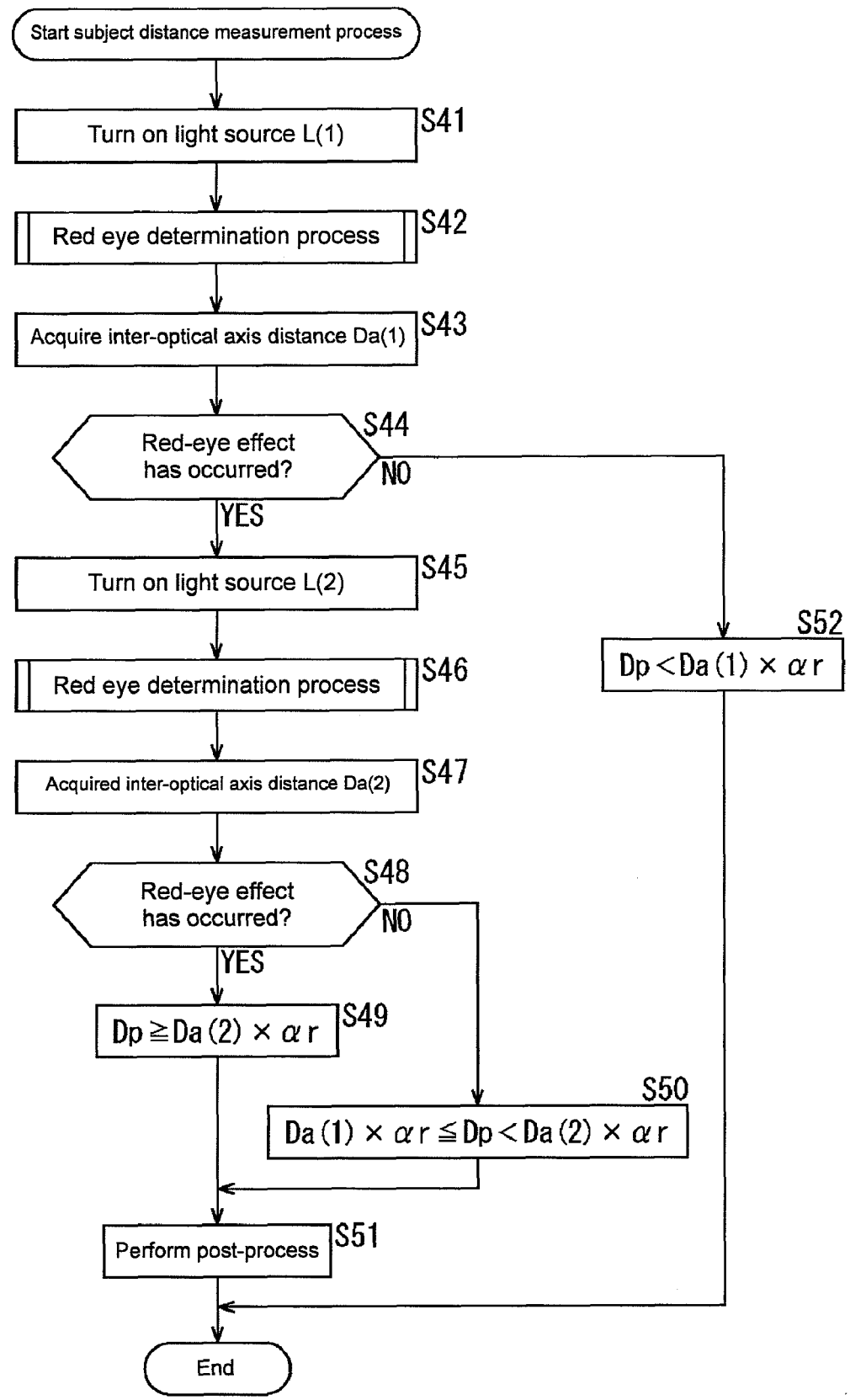
FIG. 12 shows a flowchart for describing a subject distance measurement process executed by the imaging device of FIG. 9.

In step S301, the light source L(1) of the illumination unit 211 is turned on by the process similar to step S41 of FIG. 12.

Figure 23:
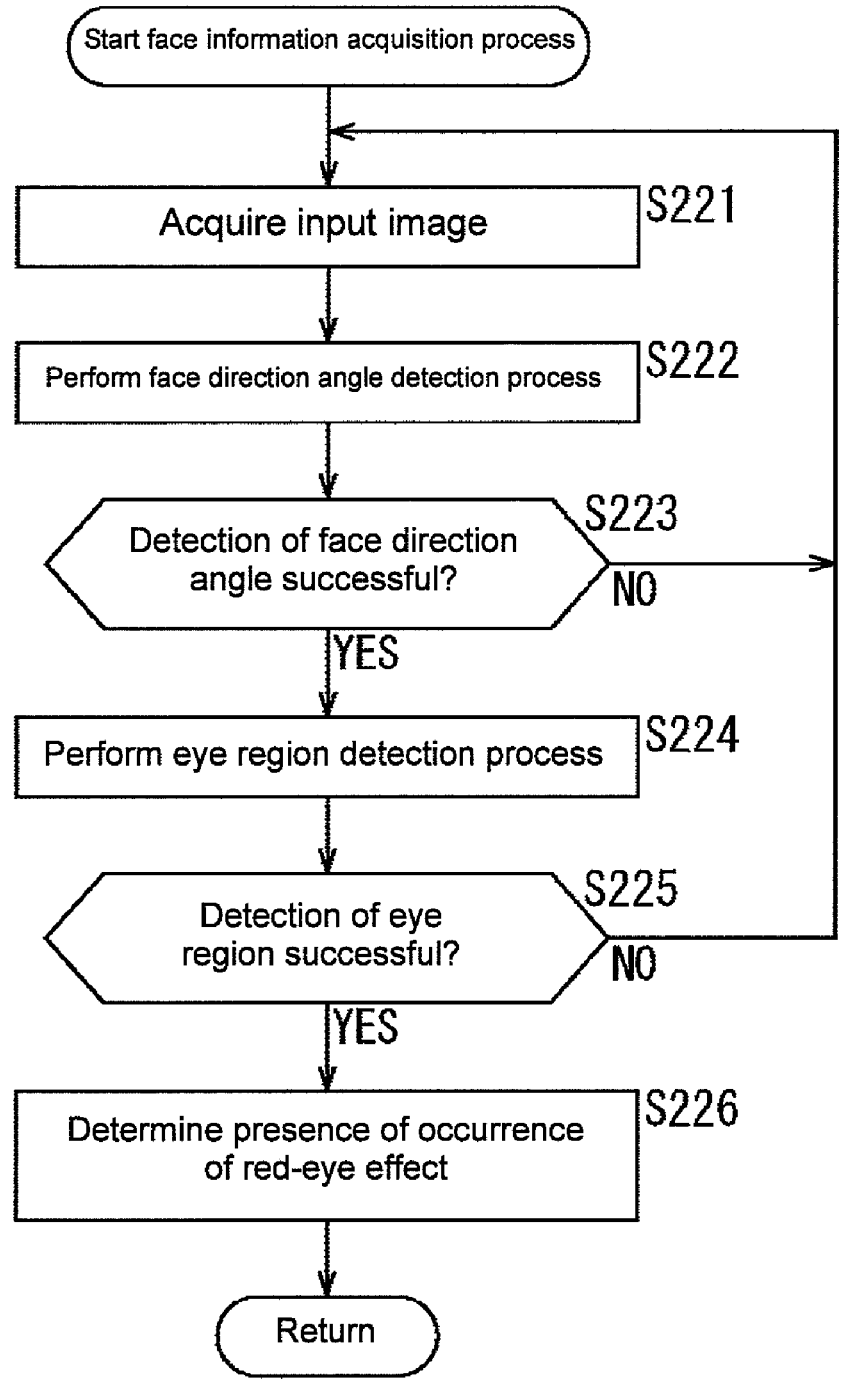
FIG. 23 shows a flowchart for describing details of a face information acquisition process.

In step S302, the face information acquisition process of FIG. 23 is executed.

Figure 22:
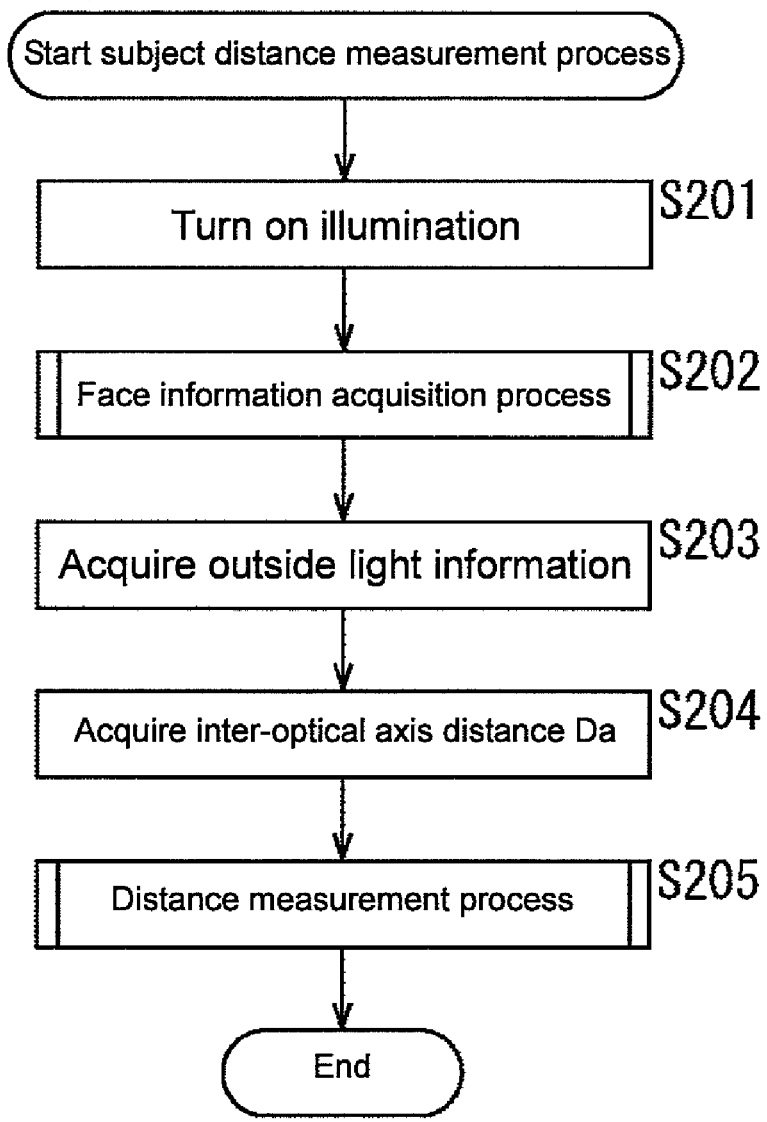
FIG. 22 shows a flowchart for describing a subject distance measurement process executed by the imaging device of FIG. 21.

In step S303, the outside light information is acquired, whether or not the outside light is bright is determined, and the information indicating the determination result is provided to the distance measuring section 621 by the process similar to step S203 of FIG. 22.

In step S304, the distance measuring section 621 acquires the information indicating the inter-optical axis distance Da(1) from the illumination controlling section 221.

In step S305, the distance measuring section 621 executes a distance measurement process (1). The details of the distance measurement process (1) will be described below with reference to a flowchart of FIG. 27.

In step S341, whether or not the red-eye effect has occurred is determined similar to the process of step S4 of FIG. 7. The process proceeds to step S342 if determined that the red-eye effect has occurred.

In step S342, the distance measuring section 621 determines that subject distance Dp≧inter-optical axis distance Da(1)×red eye constant αr. The distance measurement process (1) is thereafter terminated.

The post process similar to step S6 of FIG. 7 may be performed after step S342.

If determined that the red-eye effect has not occurred in step S341, the process proceeds to step S343.

In step S343, the distance measuring section 621 determines whether or not the outside light is bright based on the determination result of the outside light information acquiring section 522. The process proceeds to step S344 if determined that the outside light is dark.

In step S344, the distance measuring section 621 determines whether or not the face direction angle is smaller than a predetermined threshold value based on the determination result of the face direction detecting section 521. The process proceeds to step S345 if determined that the face direction angle is smaller than the predetermined threshold value.

In step S345, the distance measuring section 621 determines that subject distance Dp<inter-optical axis distance Da(1)×red eye constant αr. The distance measurement process (1) is thereafter terminated.

If determined that the face direction angle is greater than or equal to the predetermined threshold value in step S344, the process proceeds to step S346.

Figure 24:
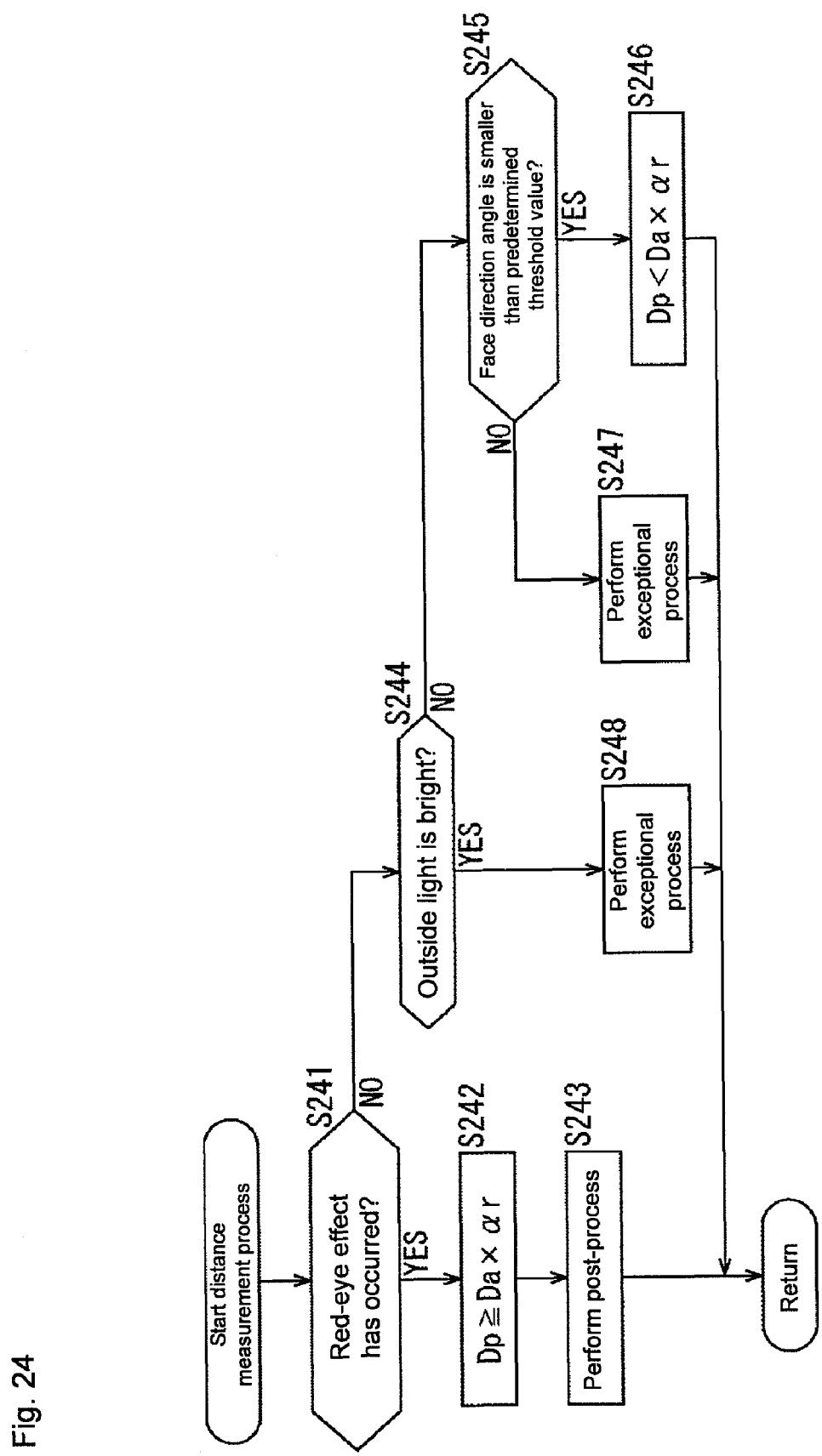
FIG. 24 shows a flowchart for describing details of a distance measurement process.

In step S346, the distance measuring section 621 performs an exceptional process similar to step S247 of FIG. 24. The distance measurement process (1) is thereafter terminated.

If determined that the outside light is bright in step S343, the process proceeds to step S347.

In step S347, the distance measuring section 621 performs an exceptional process similar to step S248 of FIG. 24. The distance measurement process (1) is thereafter terminated.

Returning to FIG. 26, in step S306, the distance measuring section 621 determines whether or not the subject distance is confirmed based on the result of the process of step S305. If determined that the subject distance is confirmed, that is, if determined that subject distance Dp≧inter-optical axis distance Da(1)×red eye constant αr or subject distance Dp<inter-optical axis distance Da(1)×red eye constant αr in the process of step S305, the process proceeds to step S307.

In step S307, the distance measuring section 621 determines whether or not subject distance Dp≧inter-optical axis distance Da(1)×red eye constant αr. If determined that subject distance Dp≧inter-optical axis distance Da(1)×red eye constant αr, that is, the red-eye effect occurred by the light source L(1), the process proceeds to step S308.

In step S308, the light source L(1) of the illumination unit 211 is turned off and the light source L(2) of the illumination unit 211 is turned on by the process similar to step S45 of FIG. 12.

In step S309, the face information acquisition process of FIG. 23 is executed.

In step S310, the outside light information is acquired, and the information indicating the determination result of the brightness of the outside light is provided to the distance measuring section 621 similar to the process of step S303.

In step S311, the distance measuring section 621 acquires the information indicating the inter-optical axis distance Da(2) from the illumination controlling section 221.

In step S312, the distance measuring section 621 executes a distance measurement process (2), and terminates the subject distance measurement process. The details of the distance measurement process (2) will be described below with reference to a flowchart of FIG. 28.

In step S371, whether or not the red-eye effect has occurred is determined similar to the process of step S4 of FIG. 7. The process proceeds to step S372 if determined that the red-eye effect has occurred.

in step S372, the distance measuring section 621 determines that subject distance Dp≧inter-optical axis distance Da(2)×red eye constant αr, and in step S373, the post process is performed similar to the process of step S6 of FIG. 7, and the distance measurement process (2) is terminated.

If determined that the red-eye effect has not occurred in step S371, the process proceeds to step S374.

Figure 27:
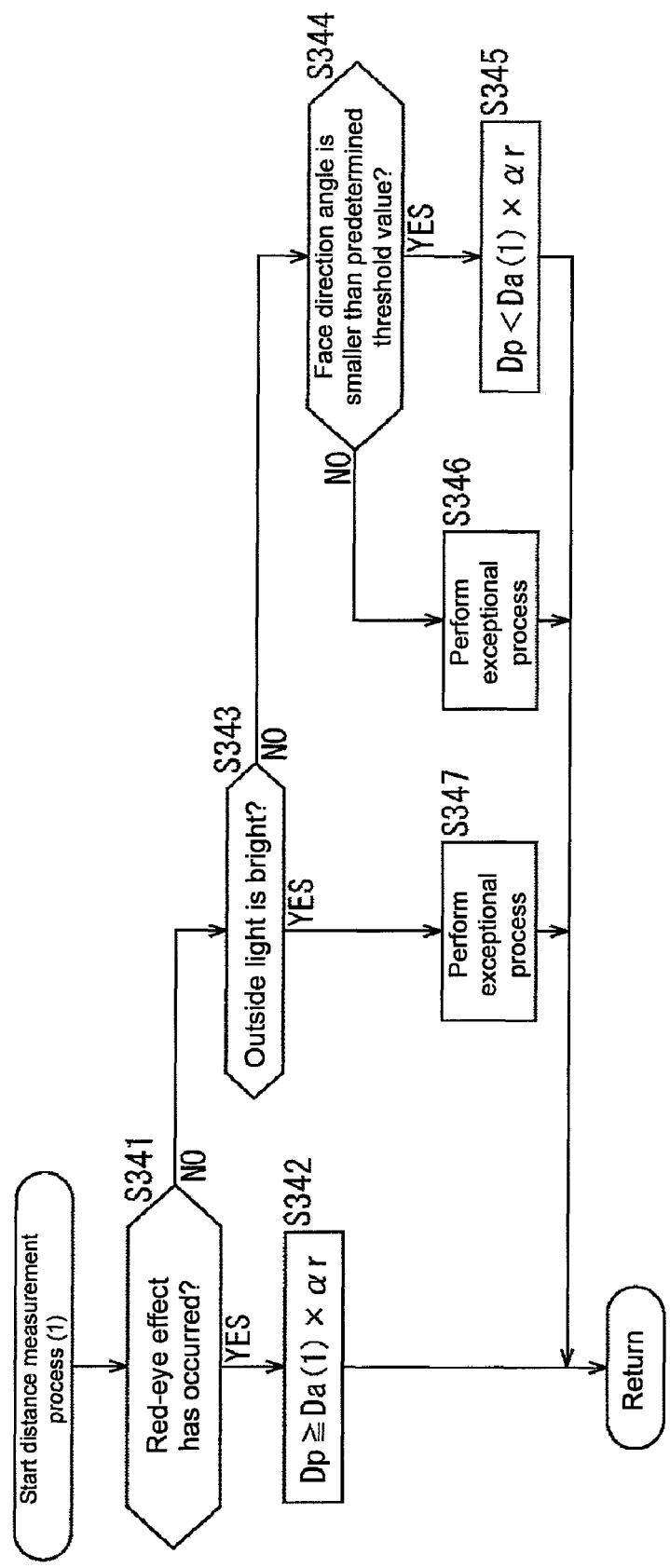
FIG. 27 shows a flowchart for describing details of a distance measurement process (1)
Figure 28:
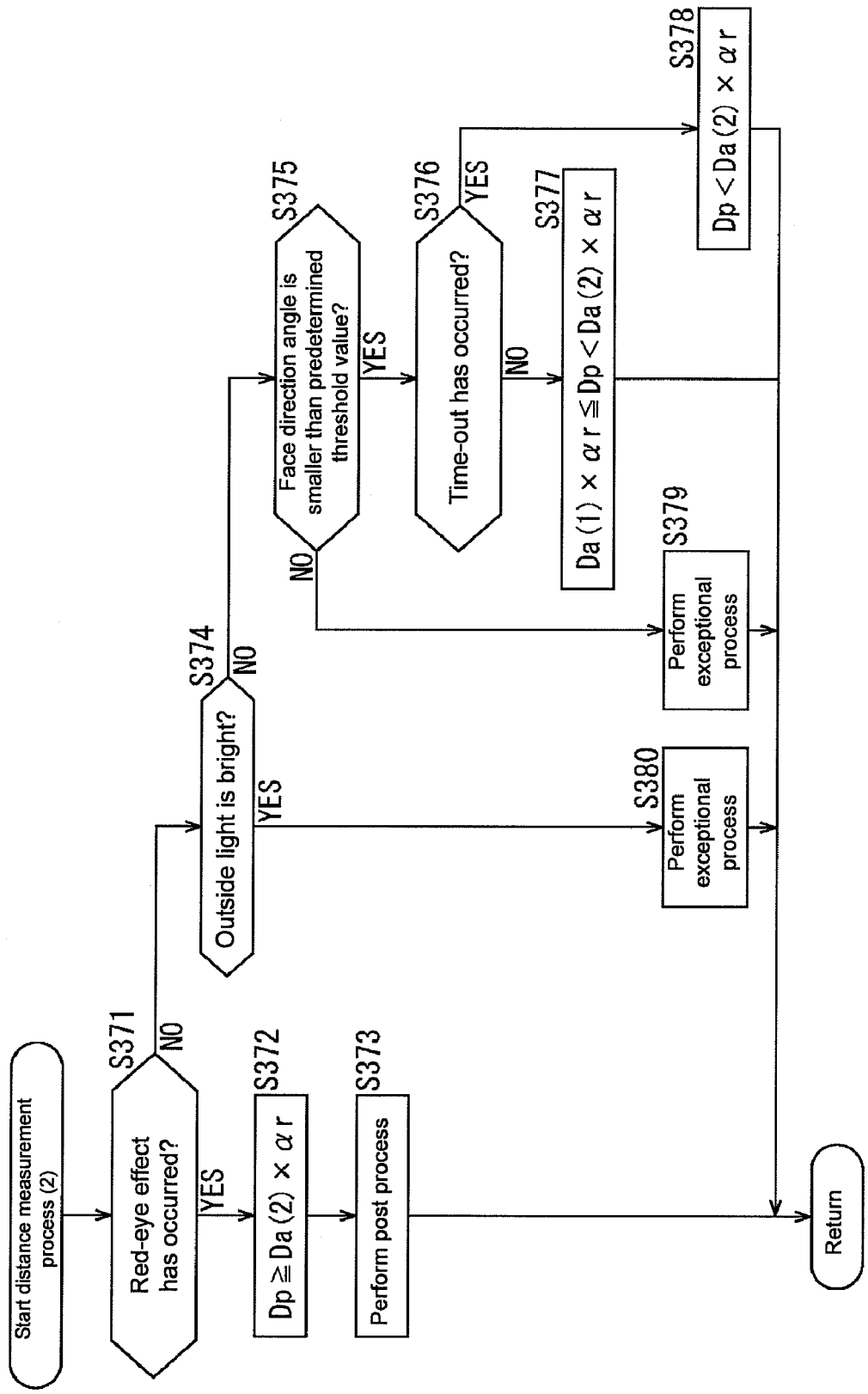
FIG. 28 shows a flowchart for describing details of a distance measurement process (2)

In step S374, whether or not the outside light is bright is determined similar to the process of step S343 of FIG. 27. The process proceeds to step S375 if determined that the outside light is dark.

In step S375, whether or not the face direction angle is smaller than a predetermined threshold value is determined similar to the process of step S344 of FIG. 27. The process proceeds to step S376 if determined that the face direction angle is smaller than the predetermined threshold value.

In step S376, the distance measuring section 621 determines whether or not time-out has occurred. Specifically, the distance measuring section 621 determines that the time-out has not occurred if the time from when the presence of occurrence of the red-eye effect by the light source L(1) is determined until the presence of occurrence of the red-eye effect by the light source L(2) is determined is smaller than a predetermined threshold value (e.g., one second), and the process proceeds to step S377.

In step S377, the distance measuring section 621 determines that inter-optical axis distance Da(1)×red eye constant αr≦subject distance Dp<inter-optical axis distance Da(2)× red eye constant αr. The distance measuring section 621 outputs the information indicating the measurement result of the subject distance Dp to the post-stage. The distance measurement process (2) is thereafter terminated.

The distance measuring section 621 determines that the time-out has occurred if the time from when the presence of occurrence of the red-eye effect by the light source L(1) is determined until the presence of occurrence of the red-eye effect by the light source L(2) is determined is greater than or equal to a predetermined threshold value (e.g., one second) in step S376, and the process proceeds to step S378.

In step S378, the distance measuring section 621 determines that subject distance Dp<inter-optical axis distance Da(2)×red eye constant αr. In other words, in this case, since a predetermined time has elapsed from when the presence of occurrence of the red-eye effect by the light source L(1) is determined, and the inter-subject distance has a high possibility of being changed from the relevant point, the determination result of the red-eye effect by the light source L(1) is discarded, and only the determination result of the red-eye effect by the light source L(2) is used. The distance measuring section 621 outputs the information indicating the measurement result of the subject distance Dp to the post-stage. The distance measurement process (2) is thereafter terminated.

If determined that the face direction angle is greater than or equal to the predetermined threshold value in step S375, the process proceeds to steps S379.

In step S379, the distance measuring section 621 performs an exceptional process similar to step S247 of FIG. 24. The distance measurement process (2) is thereafter terminated.

If determined that the outside light is bright in step S374, the process proceeds to step S380.

In step S380, the distance measuring section 621 performs an exceptional process similar to step S248 of FIG. 24. The distance measurement process (2) is thereafter terminated.

Returning to FIG. 26, if determined as not subject distance Dp≧inter-optical axis distance Da(1)×red eye constant αr in step S307, that is, the red-eye effect has not occurred by the light source L(1), the process proceeds to step S313.

In step S313, the distance measuring section 621 determines that subject distance Dp<inter-optical axis distance Da(1)×red eye constant αr. The distance measuring section 621 outputs the information indicating the measurement result of the subject distance Dp to the post-stage. The subject distance measurement process is thereafter terminated.

If determined that the subject distance cannot be confirmed in step S306, the subject distance measurement process is terminated.

In the fifth and sixth embodiments of the present invention, therefore, the wrong measurement result of the subject distance is prevented from being output to the post-stage when the red-eye effect is not detected.

In the post-stage of the imaging device 501 or the imaging device 601, the reason the subject distance is unconfirmed can be known, and the process corresponding to such a reason can be performed. For example, if the outside light is bright, an anti-glare process of alleviating the glare of the subject person can be performed by the device of the post-stage, or if the subject person is looking away, the subject person may be advised not to look away.

Although a detailed description will not be given, the process of determining whether or not to confirm the subject distance when the red-eye effect has not occurred may be added to the third and fourth embodiments of the present invention. In this case, for example, the face information acquisition process of FIG. 23 is executed instead of the red eye determination process of step S74 of FIG. 15, step S104 of FIG. 18, and step S114 of FIG. 19, and the outside light information is acquired, so that the process of determining whether or not to confirm the subject distance can be executed when determined that the red-eye effect has not occurred. When determined that the red-eye effect has not occurred, time-out of the processing time may be detected as in step S376 of FIG. 28, as necessary, and whether to choose the determination result on the presence of occurrence of the red-eye effect may be made.

Instead of detecting the face direction angle, the process of detecting the pupil of the subject person in the input image may be executed, and whether or not to confirm the subject distance may be determined based on the detection result. In other words, if determined that the red-eye effect has not occurred, the subject distance is confirmed when the pupil of the subject person can be detected and when the outside light is dark, and the subject distance is unconfirmed when the pupil of the subject person cannot be detected or when the outside light is bright.

The pupil detection process needs to use the method in which the detection result is not influenced by the presence of occurrence of the red-eye effect. Furthermore, when the pupil detection process is executed, for example, if determined that the red-eye effect has occurred although the detection of the pupil failed, the subject distance may not be confirmed assuming the determination process of the red-eye effect is a wrong determination.

When the imaging device according to one or more embodiments of the present invention is mounted on a moving body such as a vehicle, the red-eye effect sometimes occurs in rare cases by the outside light other than the illumination light at the instant the outside light changes from a dark state to a bright state such as at the instant of passing through the exit of a tunnel. The outside light information is constantly acquired irrespective of the presence of occurrence of the red-eye effect, the state of the outside light is monitored, and the subject distance may not be confirmed for a predetermined time (e.g., for one second) after the outside light changed from the dark state to the bright state. In this case, the reason the subject distance is unconfirmed, which is that the outside light changed from the dark state to the bright state, may be notified to the device of the post-stage, so that measures such as anti-glaring can be temporarily carried out while the eyes of the driver adapt to the change of outside light.

When the outside light changed from the bright state to the dark state such as when passing through the entrance of the tunnel, the subject distance is sometimes confirmed as the outside light becomes dark before the eyes of the driver adapt to the change in outside light and the red-eye effect occurs although the red-eye effect has not occurred by the brightness of the outside light up to then. The outside light information is constantly acquired irrespective of the presence of occurrence of the red-eye effect, the state of the outside light is monitored, and the subject distance may not be confirmed for a predetermined time (e.g., for one second) after the outside light changed from the bright state to the dark state.

The order of the face direction angle detection process and the eye region detection process may be interchanged. However, when performing the pupil detection process instead of the face direction angle detection process, the pupil detection process is desirably performed after performing the eye region detection process.

In the above description, there has been described an example where an exceptional process is performed without performing the determination of the face direction angle when the outside light is bright since it is a sufficient reason the red-eye effect has not occurred at the relevant time point, but the determination process of the face direction angle may be executed even when the outside light is bright to detect that "outside light is bright and subject person is looking away", and an exceptional process corresponding thereto may be performed.

Variants of the embodiments of the present invention will be described below.

Figure 29:
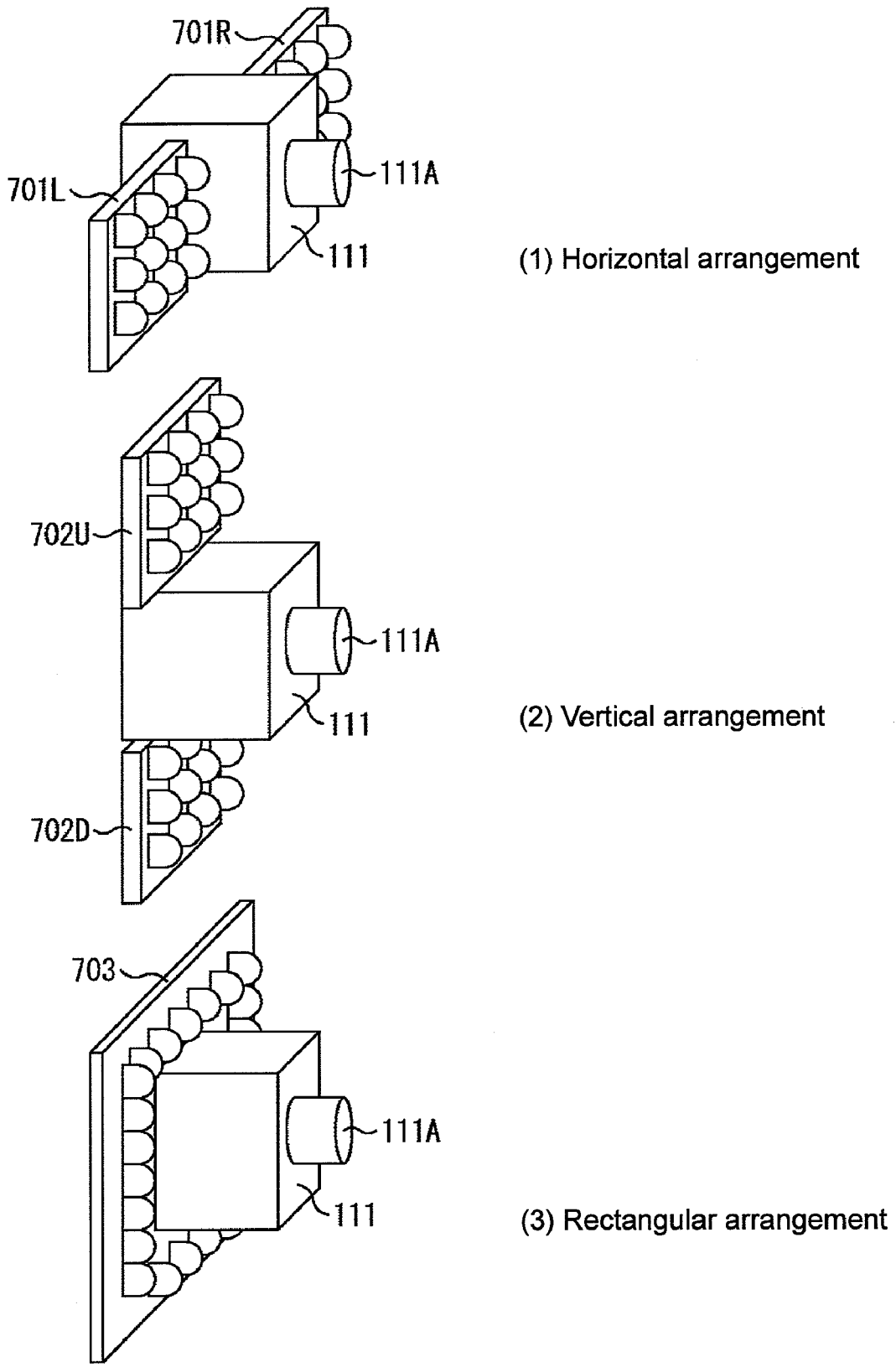
FIG. 29 shows a view showing an example of arrangement of the illumination unit.

In the above description, an example of installing the illumination unit on the left side facing the front surface of the imaging unit 111 has been described, but the illumination unit may be installed at other positions. For instance, the illumination unit may be installed on the right side facing the front surface of the imaging unit 111, or may be installed on both left and right sides of the imaging unit 111 as in illumination units 701L, 701R of FIG. 29. Furthermore, the illumination unit may not be installed on the side of the imaging unit 111, and may be installed on the upper or the lower side of the imaging unit 111, or may be installed on both upper and lower sides of the imaging unit 111 as in illumination units 702U, 702D of FIG. 29. Furthermore, the illumination unit may be installed to surround the periphery of the imaging unit 111 in a ring-shape as in an illumination unit 703 of FIG. 29.

As shown in FIG. 3 described above, for example, the size of the illumination unit will not be as large as the imaging unit 111 in view of measuring the subject distance of up to one meter with the inter-optical axis distance in the range of within 50 mm.

In the above description, an example of turning on the light source one at a time has been described, but a plurality of light sources may be simultaneously turned on to ensure the required light quantity. In this case, the degree of contribution of each light source to the occurrence of the red-eye effect depends on the respective power and the directivity property. Therefore, the inter-optical axis distance needs to be obtained in view of the power and the directivity property of each light source.

Figure 30:
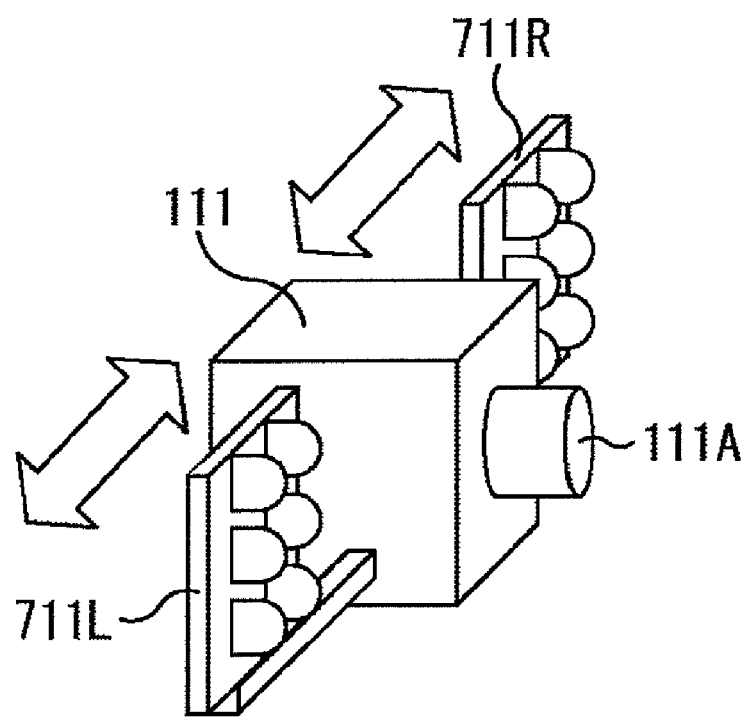
FIG. 30 shows a view for describing a mechanical control method.

Furthermore, in the above description, there has been described an example of a method (hereinafter referred to as a lighting control method) of switching the light source to light from a plurality of light sources arranged in the illumination unit to change the inter-optical axis distance, but there may be adopted a method (hereinafter referred to as a mechanical control method) of enabling illumination units 711L, 711R installed on the left and the right of the imaging unit 111 to mechanically move to the left and the right, and physically moving the illumination units 711L, 711R with respect to the imaging unit 111 to change the inter-optical axis distance, as shown in FIG. 30.

When adopting the lighting control method, the configuration and the control of the device can be simplified and the changing of the inter-optical axis distance can be rapidly carried out compared to when adopting the mechanical control method. Furthermore, since the inter-optical axis distance with respect to each light source is known, the measurement speed of the subject distance becomes faster. On the other hand, when adopting the mechanical control method, the number of light sources can be reduced, the inter-optical axis distance can be set to an arbitrary value, and the subject distance can be more accurately measured compared to when adopting the lighting control method. Thus, the lighting control method and the mechanical control method respectively have advantages and disadvantages, and thus an appropriate method may be adopted according to purpose and condition. It should be recognized that the two methods may be combined.

In the above description, there has been described an example where the order of lighting the light source is from the side (hereinafter also referred to as an inner side) close to the imaging unit 111 to the side (hereinafter also referred to as an outer side) farther from the imaging unit 111, but lighting control may be carried out from the side farther from the imaging unit 111 to the side closer to the imaging unit 111, or all the light sources may be turned on at the beginning and turned off in order. The difference in process due to difference in the lighting order of the light sources will be described with reference to FIG. 31.

Figure 31:
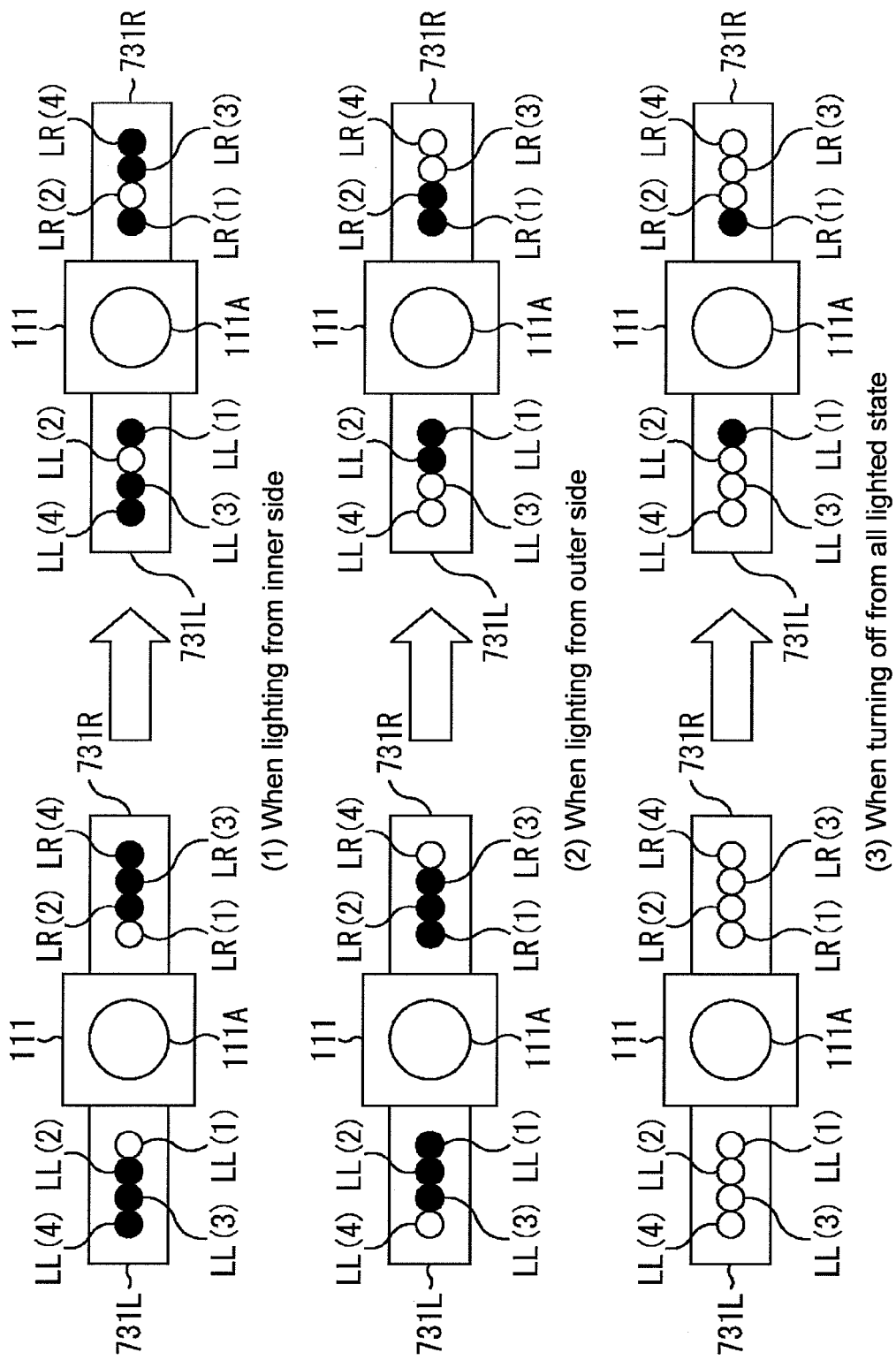
FIG. 31 shows a view for describing the difference in process due to difference in the lighting order of the light sources.

FIG. 31 shows an example where an illumination unit 731R is installed on the right side of the imaging unit 111, and an illumination unit 731L is installed on the left side of the imaging unit 111. The illumination unit 731R is arranged with a light source LR(1), a light source LR(2), a light source LR(3), and a light source (4) in order from the side close to the imaging unit 111 so as to line in the horizontal direction; and the illumination unit 731L is arranged with a light source LL(1), a light source LL(2), a light source LL(3), and a light source LL(4) in order from the side close to the imaging unit 111 so as to line in the horizontal direction. Of the light sources in FIG. 31, the light source shown with a white circle indicates that the relevant light source is turned on and the light source shown with a black circle indicates that the relevant light source is turned off.

As described in the first to fourth embodiments, if the order of turning on the light source is from the inner side to the outer side, the light source that is turned on needs to be turned off when switching the light source to turn on. For instance, as shown in the top figure of FIG. 31, the light sources LR(1), LL(1) need to be turned off when turning on the next light sources LR(2), LL(2) and checking the presence of occurrence of the red-eye effect while the light sources LR(1), LL(1) are turned on. This is because the red-eye effect is more easily induced with the light source on the inner side, and thus the state of the red-eye effect does not change even if the light source on the outer side is turned on if the light source on the inner side remains turned on.

In this case, the light source to turn on is switched in order from the inner side, and specification of the range of the subject distance becomes possible when changed from the state in which the red-eye effect is occurring to the state in which the red-eye effect is not occurring. This is the same when the illumination unit is moved from the inner side to the outer side in the mechanical control method.

When the order of turning on the light source is from the outer side to the inner side, the light source that is turned on does not necessarily need to be turned off when switching the light source to turn on. For instance, as shown in the middle figure of FIG. 31, the light sources LR(4), LL(4) do not necessarily need to be turned off when turning on the next light sources LR(3), LL(3) and checking the presence of occurrence of the red-eye effect while the light sources LR(4), LL(4) are turned on. This is because the red-eye effect is less easily induced with the light source on the outer side, and thus the state of the red-eye effect changes even if the light source on the inner side is turned on with the light source on the outer side remained turned on. The light source on the outer side may be turned off. The light quantity irradiating the subject person can be increased by having the light source on the outer side remained turned on.

In this case, the light source to turn on is switched in order from the outer side, and specification of the range of the subject distance becomes possible when changed from the state in which the red-eye effect is not occurring to the state in which the red-eye effect is occurring. This is the same when the illumination unit is moved from the outer side to the inner side in the mechanical control method.

When turning on all the light sources at the beginning, and turning the light sources off in order, the light sources are turned off in order from the inner side. For instance, as shown in the bottom figure of FIG. 31, when all the light sources LR(1) to LR(4) and the light sources LL(1) to LL(4) are turned on, the light sources are turned off from the light sources LR(1), LL(1) on the innermost side. This is because the red-eye effect is more easily induced with the light source on the inner side, and thus the state of the red-eye effect changes by turning off the light sources from the inner side. In this case, the light sources are turned off in order from the inner side, and the specification of the range of the subject distance becomes possible when changed from the state in which the red-eye effect is occurring to the state in which the red-eye effect is not occurring.

When turning on the light sources in order irrespective of the direction of the lighting order (inner side to outer side, or outer side to inner side), the light source do not necessarily need to be turned on one at a time, and every other light source may be turned on if the direction of the lighting order is constant.

In the embodiments of the present invention, factors that become a problem when irradiating infrared light include reflection of the illumination light by an eyeglass and the surface of the eyeball. Specifically, as shown on the upper side of FIG. 32, when the illumination light, which is the infrared light, is reflected at the surface of an eyeglass 751 and a white luminance point 754 occurs, in addition to the red-eye effect 735 of the eye 752, the white luminance point 754 may be mistakenly recognized as the red-eye effect. Therefore, if the red-eye effect has not occurred at the eye 752, the subject distance may be mistakenly measured by the influence of the white luminance point 754. This does not need to be seen as a problem if the accuracy of the red eye determination is sufficient, but it is effective to use a polarization filter to be optically more certain.

FIG. 33 shows an example of an installation of the polarization filter. Specifically, a polarization filter 762 is arranged in front of an illumination unit 761, and a polarization filter 763, which polarizing direction is orthogonal to the polarization filter 762, is arranged in front of the lens 111A of the imaging unit 111.

In this case, the illumination light from the illumination unit 761 is polarized in a predetermined direction by the polarization filter 762, and reaches the eyeglass 751 and the eye 752 of the subject person. Since the illumination light is substantially mirror reflected by the eyeglass 751, the reflected light reaches the polarization filter 763 while being polarized and then attenuated by the polarization filter 763, and reaches the lens 111A of the imaging unit 111. The illumination light is diffusely reflected by the eye 752, and the direction of the polarized illumination light is rotated, and thus the reflected light from the eye 752 reaches the lens 111A of the imaging unit 111 without being attenuated barely by the polarization filter 763. Thus, as shown on the lower side in FIG. 32, the light of the white luminance point 754 of the eyeglass 751 can be attenuated without attenuating the light of the red-eye effect 753 contained in the reflected light from the eye 752, whereby mistaken detection of the red-eye effect can be prevented.

If the eyeglass 751 is performed with coating process such as AR (Anti-Reflection) coating or scratch resistant coating, the reflected light from the eyeglass 751 is not a complete mirror reflection and slightly rotates, and thus is not completely shielded by the polarization filter 763. If the eyeglass 751 is not performed with the coating process, the reflected light from the eyeglass 751 becomes a substantially complete mirror reflection, and thus can be substantially completely shielded by the polarization filter 763. Although a detailed description is not given, the reflected light from the surface of the eyeball becomes a substantially complete mirror reflection, and thus can be substantially completely shielded by the polarization filter 763.

When the illumination light is a visible light, the reflected light of the eyeglass and the surface of the eyeball becomes white, and the light of the red-eye effect becomes red, and thus the lights can be clearly distinguished without arranging a polarization filter.

Figure 34:
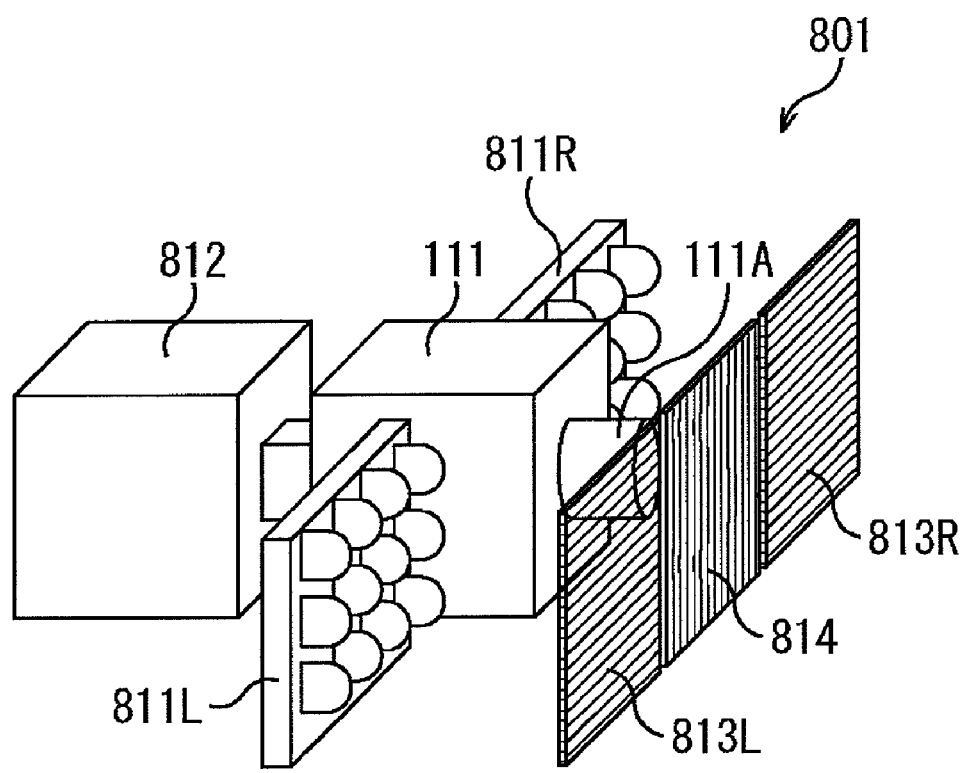
FIG. 34 shows a schematic view showing a configuration example of an outer appearance of an imaging device using the polarization filter.

FIG. 34 shows a schematic view showing a configuration example of an outer appearance of an imaging device using a polarization filter. In the figure, the same reference numerals are denoted for the portions corresponding to FIG. 4.

An imaging device 801 is configured to include the imaging unit 111, illumination units 811L, 811R, a measurement unit 812, polarization filters 813L, 813R, and a polarization filter 814.

The illumination unit 811L and the illumination unit 811R are arranged on the left side and on the right side facing the front surface of the imaging unit 111, respectively, and the measurement unit 812 is connected to the back surface of the imaging unit 111. The illumination unit 811L and the illumination unit 811R are arranged with a light source that emits an infrared light configured by the LED (Light Emitting Diode), or the like in a lattice form so as to be bilaterally symmetrical to each other. The polarization filter 813L and the polarization filer 813R have the same polarizing direction, where the polarization filter 813L is arranged in front of the illumination unit 811L, and the polarization filter 813R is arranged in front of the illumination unit 811R. The polarization filter 814 has the polarizing direction orthogonal to the polarization filters 813L, 813R, and is arranged in front of the lens 111A of the imaging unit 111.

The illumination lights of the illumination units 811L, 811R are polarized in a predetermined direction by the polarization filters 813L, 813R, and then reach the subject person. The reflected light reflected by the subject person is polarized in the direction orthogonal to the polarizing filters 813L, 813R by the polarization filter 814, and reaches the lens 111A of the imaging unit 111. Therefore, the component (e.g., component mirror reflected by the eyeglass and the surface of the eyeball of the subject person) regularly reflected by the subject person of the reflected lights reflected by the subject person is shielded by the polarization filter 813.

An example where the infrared light is used for the illumination light has been discussed above, but visible light may be used. However, when using the visible light, the red-eye effect weakens by the contraction of the pupil, and thus is desirably applied under the condition of irradiating the illumination light only for a very short period of time as in a strobe light. Furthermore, when the visible light is used, detection of the red-eye effect becomes difficult when wearing sunglasses or when wearing red color contact lenses.

The method of using the measured subject distance includes, for example, controlling the zoom magnification of the imaging unit 111 and the illumination strength of the illumination unit according to the subject distance. When the imaging device is arranged near the steering wheel of the vehicle, the opening pressure of the air bag may be controlled according to the subject distance. Furthermore, in the face detection process, the subject distance may be used in the correction of the detection result such as ignoring the detection result when the face is too large or too small with respect to the subject distance. Moreover, the display luminance, the display size, the display content, and the like of the installment panel may be controlled according to the subject distance when the imaging device is arranged near the installment panel of the vehicle.

One or more embodiments of the present invention is applicable to equipment incorporating an imaging device or an imaging element such as a portable telephone in addition to the imaging device.

The series of processes described above may be executed by hardware or may be executed by software. When executing the series of processes by software, the program configuring such software is installed from a program recording medium to a computer incorporated in a dedicated hardware, or a general personal computer capable of executing various functions by installing various programs.

Figure 35:
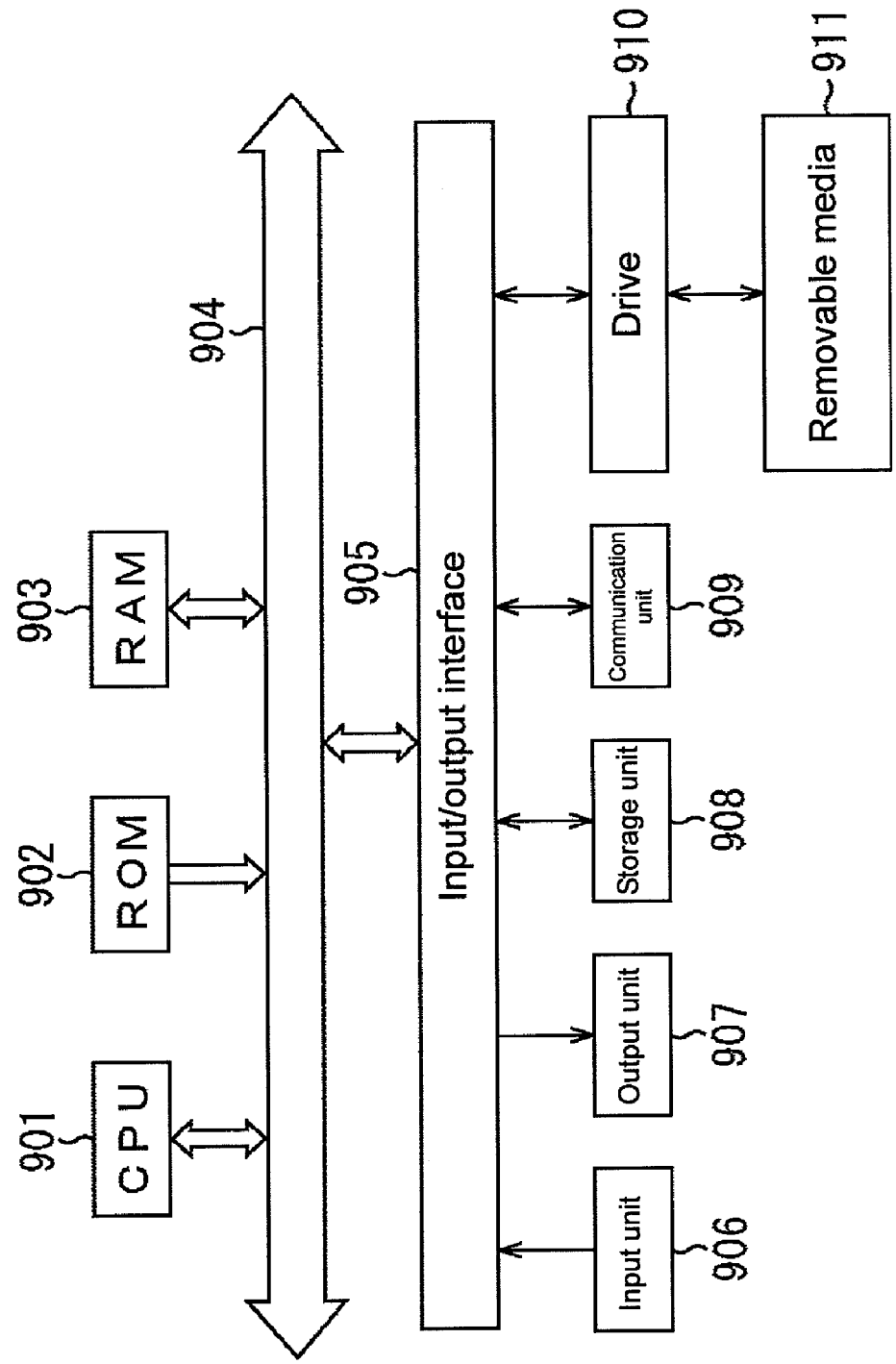
FIG. 35 shows a block diagram showing a configuration example of a computer.

FIG. 35 shows a block diagram showing a configuration example of hardware of a computer which executes the series of processes by a program.

In the computer, a CPU (Central Processing Unit) 901, a ROM (Read Only Memory) 902, and a RAM (Random Access Memory) 903 are connected to each other by a bus 904

The bus 904 is also connected with an input/output interface 905. The input/output interface 905 is connected with an input unit 906 including a keyboard, a mouse, a microphone, and the like; an output unit 907 including a display, a speaker, and the like; a storage unit 908 including a hard disk and a non-volatile memory; a communication unit 909 including a network interface and the like; and a drive 910 for driving a removable media 911 such as a magnetic disk, an optical disk, a magneto optical disk, or a semiconductor memory.

In the computer configured as above, the CPU 901 loads the program stored in the storage unit 908 to the RAM 903 through the input/output interface 905 and the bus 904, and executes the program to perform the series of processes described above.

The program to be executed by the computer (CPU 901) is recorded on the removable media 911 which is a package media such as a magnetic disk (including flexible disk), an optical disk (CD-ROM (Compact Disc-Read Only Memory), a DVD (Digital Versatile Disc) etc.), a magneto optical disk, or a semiconductor memory, or is provided through a wired or wireless transmission medium such as a local area network, Internet, or digital satellite broadcast.

The program can be installed in the storage unit 908 through the input/output interface 905 by loading the removable media 911 in the drive 910. The program can also be received at the communication unit 909 through the wired or wireless transmission medium and installed in the storage unit 908. Furthermore, the program can be installed in advance in the ROM 902 or the storage unit 908.

The program to be executed by the computer may be a program in which the processes are performed in times series in the order described in the present specification, or may be a program in which the processes are performed in parallel or at the necessary timing such as when call-out is made.

The present invention is not limited to the embodiments described above, and various modifications may be made within a scope not deviating from the concept of the present invention.

What is claimed is:

1. A measurement device comprising:
   a light source;
   an imaging device; and
   a distance measuring section,
   wherein the distance measuring section obtains a distance between the imaging device and a person based on a presence of occurrence of a red-eye effect at an eye of the person in an image in which the person irradiated with an illumination light emitted from the light source is imaged by the imaging device, and a distance between an optical axis of the imaging device and the light source.

2. The measurement device according to claim 1, further comprising:
   a plurality of light sources;
   an illumination controlling section for controlling lighting and non-lighting of the plurality of light sources,
   wherein the distance measuring section obtains the distance between the imaging device and the person based on the presence of occurrence of the red-eye effect at the eye of the person when each of the plurality of light sources is lighted, and a distance between the optical axis of the imaging device and the lighted light source.

3. The measurement device according to claim 2, wherein the illumination controlling section obtains a range of a distance between the imaging device and the person based on a distance between one of the plurality of light sources farthest from the optical axis of the imaging device at which the red-eye effect occurred and the optical axis of the imaging device, and a distance between one of the plurality of light sources closest to the optical axis of the imaging device at which the red-eye effect did not occur and the optical axis of the imaging device.

4. The measurement device according to claim 1, wherein the illumination light is an infrared light.

5. A measurement method of a measurement device for measuring a distance between an imaging device and a person; the method comprising:
   a distance measuring step of obtaining the distance between the imaging device and the person based on a presence of occurrence of a red-eye effect at an eye of the person in an image in which the person irradiated with an illumination light emitted from a light source is imaged by the imaging device, and a distance between an optical axis of the imaging device and the light source.

6. A computer readable medium storing a program comprising functionality for causing a computer to perform a process comprising:
   obtaining a distance between an imaging device and a person based on a presence of occurrence of a red-eye effect at an eye of the person in an image in which the person irradiated with an illumination light emitted from a light source is imaged by the imaging device, and a distance between an optical axis of the imaging device and the light source.

7. An imaging device comprising:
   a light source; and
   a distance measuring section,
   wherein the distance measuring section obtains a distance between the imaging device and a person based on a presence of occurrence of a red-eye effect at an eye of the person in an image in which the person irradiated with an illumination light emitted from the light source is imaged by the imaging device, and a distance between an optical axis of the imaging device and the light source.

* * * * *